United States Patent [19]
Kavchar

[11] Patent Number: 6,116,321
[45] Date of Patent: Sep. 12, 2000

[54] PARTS SAVING COMPACT ROLLER MECHANISM

[76] Inventor: John Kavchar, 322 B Chestnut, Santa Cruz, Calif. 95060

[21] Appl. No.: 08/777,809

[22] Filed: Dec. 31, 1996

[51] Int. Cl.$^7$ ....................................................... E06B 9/52
[52] U.S. Cl. ............................................. 160/100; 160/315
[58] Field of Search ..................................... 160/100, 313, 160/315, 318, 23.1, 301, 299, 305

[56] References Cited

U.S. PATENT DOCUMENTS

| | | | |
|---|---|---|---|
| 1,015,413 | 1/1912 | Wood . | |
| 1,258,940 | 3/1918 | Paul | 160/263 X |
| 1,363,746 | 12/1920 | Nossek | 160/313 X |
| 1,408,605 | 3/1922 | Kehres | 160/263 |
| 1,792,771 | 2/1931 | Sevison | 160/318 |
| 2,098,105 | 11/1937 | Nye | 160/23.1 |
| 2,120,175 | 6/1938 | Fritz | 160/301 |
| 2,307,095 | 1/1943 | Zaferakis | 160/318 X |
| 3,105,542 | 10/1963 | Lynch | 160/28 |
| 3,911,990 | 10/1975 | Hoover et al. | 160/100 |
| 4,042,004 | 8/1977 | Kwan | 160/91 |
| 4,233,781 | 11/1980 | Roe | 49/504 |
| 4,429,729 | 2/1984 | Winslow | 160/315 |
| 4,458,739 | 7/1984 | Murray et al. | 160/23.1 |
| 4,480,676 | 11/1984 | Solomon | 160/272 |
| 4,651,797 | 3/1987 | Lange | 160/290.1 |
| 4,757,852 | 7/1988 | Zentof et al. | 160/23.1 |
| 4,825,921 | 5/1989 | Rigter | 160/23.1 |
| 5,078,198 | 1/1992 | Tedeschi | 160/315 |
| 5,505,244 | 4/1996 | Thumann | 160/23.1 |

OTHER PUBLICATIONS

Disclosure Doc# 405746 Oct., 1996 "Sliding Socket Window . . . " Kavchar.

Primary Examiner—David M. Purol

[57] ABSTRACT

Two designs for a spring-loaded roller mechanism (154a and 154) having monocoque and semi-monocoque characteristics. The monocoque design uses a single tube for both roller and axle (226), thus it carries most of the rotational stress. A pair of mounting plates (209) at either end serve multiple functions. They hold the assembly to a base surface, they serve as end caps for both a housing and the roller itself, they serve as the spindle around which the roller rotates, and either one can hold one end of a coil spring (166a). The other end of the spring attaches to the roller through a slot. Thus, the roller can be rotated around the mounting plates using the biasing force of the spring. The semi-monocoque design uses two tubes. One of them, an inner tube, slides into another, or outer tube. The outer tube is the roller. One end is open, the other closed. The open end allows the inner tube to slide into it. The closed end is circular allowing it to rotate within a holder. The inner tube serves as an axle. One end is open, the other closed. The open end slides into the outer tube thus forming a hollow center throughout. The closed end is rectangular, held against rotation in a holder. Slots in both tubes secure opposite ends of a spring. Thus, the outer tube can be rotated around the inner tube using the biasing force of the spring.

13 Claims, 11 Drawing Sheets

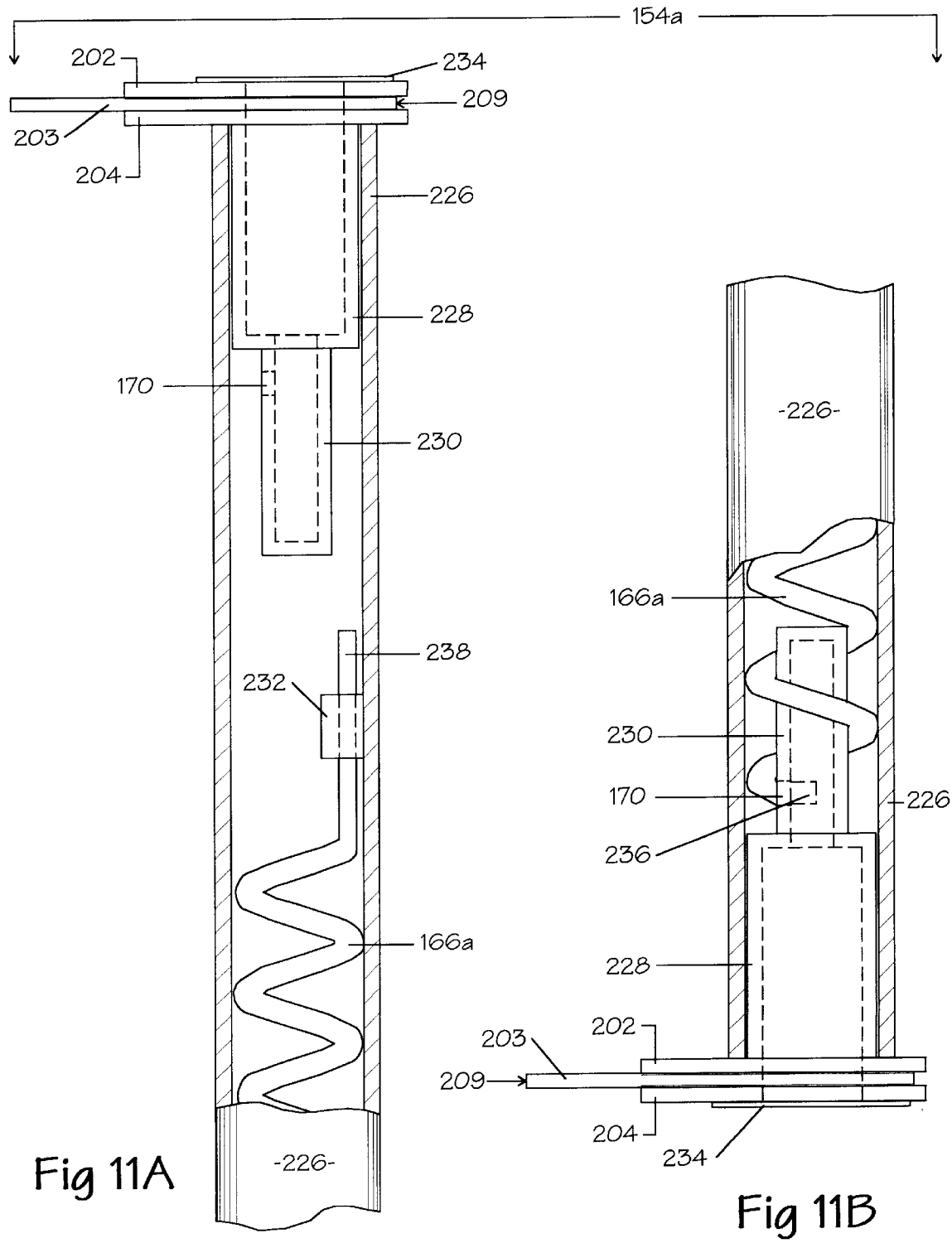

PARTS SAVING COMPACT ROLLER MECHANISM

BACKGROUND—FIELD OF INVENTION

This invention relates primarily to window structures for vehicles such as recreational vehicles ("RVs"). It also relates to retractable coverings for window and door openings and the roller mechanism as well.

BACKGROUND—DESCRIPTION OF PRIOR ART

In recreational vehicles, including boats, travel trailers and motor homes, interior space is minimal. RV manufacturers work around the problem by incorporating a generous number of windows into their designs. Large clear windows are desirable in an RV since they give the illusion that the interior is more spacious than it is.

RVs typically attract buyers who enjoy an out-of-doors lifestyle. Large clear windows serve to enhance that lifestyle. They are meant to offer unobstructed views outside. In effect, they are meant to bring the outside world to the indoors.

The majority of windows used in RVs are of the socket type represented by U.S. Pat. Nos. 4,042,004 (1976) and 4,233,781 (1978), both to Hehr International. Such windows suffer from a number of disadvantages:

(a) The typical RV window and its frame have rounded corners. The window is basically divided in half with one panel being fixed and the other one slideable. The slideable half is covered on the inside by a window screen. Thus, it can be said that half the windows in RVs are typically covered by screens.

Because windows are so important in RVs, it is a shame that half of them are covered with screens even when they are closed. The screens distort the view to such a degree that is generally preferable to look through the half of the window that is not covered. On the other hand, the screens are essential when the window is open to protect against mosquitos, flies and other undesirable insects.

(b) In the current manufacture of the common style RV window, the screens, which consist of a generic unmodified material, not only distort the view when the window is closed. They are also ineffective in preventing an infiltration of bugs. In the common window, a gap exists between the screen and slideable window pane. When the window is open, bugs find their way into the gap. By crawling into the gap and along the channel that holds the slideable glass panel, the bugs can eventually find their way inside the RV. Although the common window assembly uses sealing rubber along the screen frame to mitigate bug infiltration, it is not adequately effective.

(c) Another disadvantage of the typical RV window has to do with cleanliness. In the current design, with the window slid fully open, the screen still covers a couple inches of the window. Thus, when you slide the window open to wash the inside of it, you cannot reach the portion that is still covered by the screen. Consequently, that portion of the window can get noticeably dirty. To wash it, you must either remove the screen or attack the window from the outside by reaching into the gap between the window pane and the screen. In so doing, you risk damaging the screen or pulling it from its frame.

A number of retractable window coverings have been proposed. Examples of them can be found in U.S. Pat. Nos. 1,015,413 to Wood (1912), U.S. Pat. No. 3,105,542 to Zark (1959), U.S. Pat. No. 3,911,990 to Hoover, et al (1973), U.S. Pat. No. 4,458,739 to Murray (1982), U.S. Pat. No. 4,480,676 to Solomon (1983) and 4,825,921 to Rigier (1987). They all relate to window and screen combinations for use in a fixed building. Such applications do not consider each of the specific problems relating to RVs as discussed above. Thus, they suffer from a number of disadvantages:

(d) RV windows must use a screen that is protected from the outside when the vehicle is in motion. Otherwise, the screen would become quickly damaged by the environment regularly encountered at speed. Therefore, window screens in RVs are typically located on the inside. The patents for retractable window coverings issued to Murray, Solomon, and perhaps Wood, are the only ones cited that are designed to be installed inside.

(e) None of the retractable window covering patents consider the issue of available space. The use of space is an important consideration in the design of RV windows. RV window assemblies are generally compact. They are designed to take up little of the interior width available in an RV. They are basically no wider than the width of the RV wall. Considering the importance of windows in an RV, the actual viewing area through the window is also relative. Thus, the roller mechanism for a retractable screen, and its housing unit as well, must be as compact as possible.

Only one of the patents cited herein, to Wood, utilizes a roller mechanism that can be considered compact. In those others which describe the roller mechanism in detail, they rely on the conventional design. That design utilizes a central shaft surrounded by a spring. That assembly is enclosed by a tube that has separate end caps. The number of parts in the mechanism precludes the design from being compact. The patent to Wood utilizes a roller mechanism that may perhaps be considered compact. It can be said to utilize a monocoque design. However, it suffers from other disadvantages were it to be used in RVs.

(f) Wood's patent does not consider the issue of weight nor does it take into account vibration induced noise and the potential for failure caused by vibration. The roller tube in Wood's invention is substantially solid and therefore heavy. The tube is provided with a bore to house the spring. The roller tube thus has a closed end and an open end. A screw is used at the closed end to attach the roller tube to a base plate and act as a bearing. The open end of the tube uses a pair of lugs on the base plate and the spring itself to act as the second bearing. If it were to be used in a motorized vehicle such as an RV, the screw mounting at one end would be subject to failure caused by constant vibration when the vehicle was in operation. At the other end, the spring/bearing combination would create noise induced by the vibration.

(g) None of the patents for retractable window coverings deal with a window assembly that has rounded corners. However, the typical RV window assembly has them. The rounded corners create special difficulties when you throw in the necessary inside screen location and the need to preserve both interior space and available viewing area. None of the retractable screens cited above attach to the slideable glass panel in such a way so as to address those concerns.

(h) In addition, none of the patents for retractable window coverings take into account the issue of emergency evacuation. RVs such as motorhomes and travel trailers generally have only one door. To facilitate emergency evacuation, RV manufacturers typically designate one or more windows for such a purpose. Therefore, a retractable window covering for use in an RV must facilitate that need.

In addition to the patents cited above, examples of retractable screens can also be found in U.S. Pat. Nos. 4,651,797 to Lange (1986), U.S. Pat. No. 4,757,852 to Jentof, et al (1986), and U.S. Pat. No. 5,505,244 to Thumann (1994). However, those patents were designed primarily for door openings. While they address the need for a relatively quick release to facilitate an exit, they do not consider any of the other problems that relate to RV windows.

In accordance with the Document Disclosure Program, I previously described this invention in Disclosure Document No. 405746. However, a number of the specifications listed in that document have since been modified or eliminated.

OBJECTS AND ADVANTAGES

Accordingly, several objects and advantages of the present invention are:

(a) to provide a retractable screen mechanism that leaves the glass panels unobstructed when the window is closed;

(b) to provide an effective means to prevent bugs from entering an RV when the window is open;

(c) to provide a screen that does away with any type of overlap that inhibits the ability to easily clean the entire sliding glass panel;

(d) to provide a retractable screen enclosure that is located inside the RV;

(e) to provide a compact monocoque, or semi-monocoque, roller mechanism and its housing that fits within the confines of an existing RV window assembly by using fewer parts than the conventional design;

(f) to provide a light-weight roller assembly that mitigates vibration induced noise and takes into account the potential for failure vibration can cause;

(g) to provide a means to attach one end of the screen to the slideable glass panel in such a way that preserves the aesthetics of the rounded corners, while meeting the space limitations inherent in the existing RV window;

(h) to provide a way to easily detach the screen from the slideable glass panel in case the window opening is needed for such things as an emergency exit.

Further objects and advantages are to provide an effective retractable window screen that incorporates parts from a common window assembly of the type that is used in a majority of RVs. Because the invention uses the complete outer section of the common window assembly already being manufactured, the invention requires minimal new tooling or manufacturing processes. In fact, the invention can be offered as an option for the existing window assembly. In addition, the invention utilizes an easily replaceable screen that is modified specifically for the invention. Thus, with this invention, its manufacturer can experience revenues from the sale of replacement screens that are proprietary rather than generic.

DESCRIPTION OF THE DRAWINGS

The foregoing and various additional objects, features, and advantages, will be set forth hereinafter in a sufficient degree to enable a person skilled in the art to practice the invention. The invention is described in connection with the drawings wherein:

FIG. 11A is a fragmentary elevation view, partially in section, that shows the upper portion of the monocoque roller assembly with a corresponding mounting plate.

FIG. 11B is a fragmentary elevation view, partially in section, that shows the lower portion of the monocoque roller assembly with a corresponding mounting plate.

Figure 1:
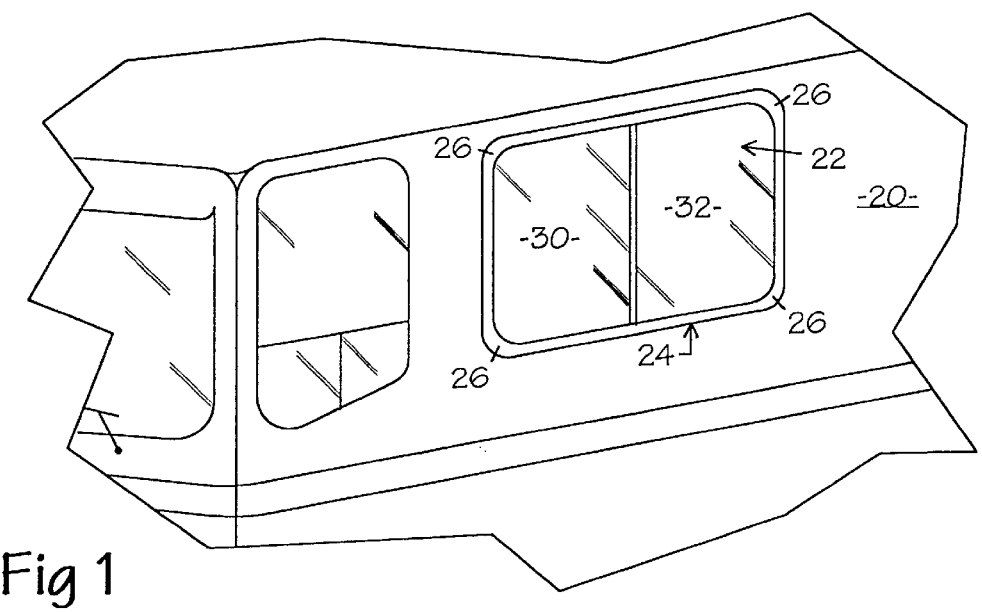
FIG. 1 is a perspective view of a recreational vehicle showing the outside of a typical window assembly.

GLOSSARY 20 recreational vehicle
22 typical window
24 outer window frame assembly
26 radius corner
28 outer circumferential flange
30 fixed glass panel
32 slideable glass panel
33 leading edge
34 slideable screen
35 trailing edge
36 inner window frame
37 top edge 38 inner section
39 bottom edge
40 square corner
42 screw
44 roller housing
46 handle
48 locking mechanism
52 outside frame member
53 sealing rubber—glass panel
54 rigid frame attachment
56 rigid screen attachment
58 flexible screen
60 screen handle
62 screen latch
63 screw
64 guide rail—screen
66 exterior wall
68 interior frame
70 interior wall
72 weather strip
73 radius edge
74 inwardly extending flange
75 window sill
76 outwardly extending flange
77 elongate midsection
78 inner parallel flange
79 outer parallel flange
80 window channel
82 mounting hole
83 through-hole
84 track guide
87 narrow screen channel
88 first inner side—guide rail
90 first outer extending flange—guide rail
92 second outer extending flange
94 sealing rubber—guide rail
94a additional sealing rubber
96 top side
96a top side
97 first outwardly extending flange
98 second outwardly extending flange
98a second outwardly extending flange
100 open end
101 modified track guide
102 housing end
104 receptacle
106 first side—rigid frame attachment
108 inwardly extending flange
109 top edge
109a outwardly facing corner
110 second side—rigid frame attachment
111 bottom edge
111a outwardly facing corner
112 protuberance
114 inner extending protuberance
115 slot
116 base side—rigid frame attachment
118 extending side
120 channel—rigid frame attachment
122 inner side
123 base side—rigid screen attachment
124 outer side
125 inwardly facing edge
126 outwardly facing edge
127 top indentation ridge
128 outer facing surface
129 bottom indentation ridge
130 inner facing surface
132 outwardly facing edge
134 outer facing surface
136 inner facing surface
137 slot
138 circular channel
139 inwardly facing edge
140 channel—rigid screen attachment
142 first edge—screen
143 stitching
144 second edge—screen
146 third edge—screen
147 fourth edge—screen
148 flexible material
150 open loop
152 rod
154 roller assembly—semi-monocoque
154a roller assembly—monocoque
156 upper tube section
158 lower tube section
160 circular closed end
162 anchor rail
164 square closed end
166 spring
166a spring
168 spring anchor
170 hole
172 rail hold
173 slot
174 intermediate shaft
176 spring hold
178 spring shaft
180 screen holder
182 elastic band
184 base plate
184a alternate base plate
186 base side—base plate
188 inwardly extending flange—base plate
190 notch
192 spring nut
194 rivet
196 upper mounting plate holder
196a alt. upper mounting plate holder
198 lower mounting plate holder
198a alt. lower mounting plate holder
200 arm
202 top surface
203 middle surface
204 bottom surface
206 upper mounting plate
208 lower mounting plate
209 mounting plate
210 circular shaped hole
210a circular shaped hole
212 square shaped hole
212a square shaped hole
214 roller cover
216 inner side
217 inwardly facing side
218 outer side
220 outer stabilizing flange
222 inner stabilizing flange
224 inwardly extending flange
226 roller tube
228 axle shaft
230 spring support
232 spring holder 234 adhesive tape
236 bottom end
238 top end

BROAD SUMMARY OF THE INVENTION

My invention is a modification of the typical window commonly used in RVs. The invention transforms the rounded corners in the outer section of the typical window into square corners on the inside. The inside square corners provide room for a roller assembly. One end of a screen is attached to the roller assembly. The other end is attached to the typical window's slideable glass panel. Thus, when you slide open the glass panel, the screen unrolls and covers the opening. The screen automatically retracts when you slide the glass panel closed.

DETAILED DESCRIPTION

While the present invention will be described with particular reference to a window used in an RV, it is to be understood that the retractable covering can be used with any type of opening in any type of structure. In addition, the description of this invention refers to a window that is oriented horizontally. Nevertheless, it shall be appreciated that the invention can also be used with a window that is oriented on a different plane. Furthermore, while this invention describes a particular use for the roller assembly itself, it is understood that the mechanism can be used in a wide variety of different applications.

Thus, with reference to FIG. 1, there is shown a recreational vehicle ("RV") 20 having a typical window 22. The typical window 22 is comprised of an outer window frame assembly 24 that has radius or rounded corners 26.

Figure 2:
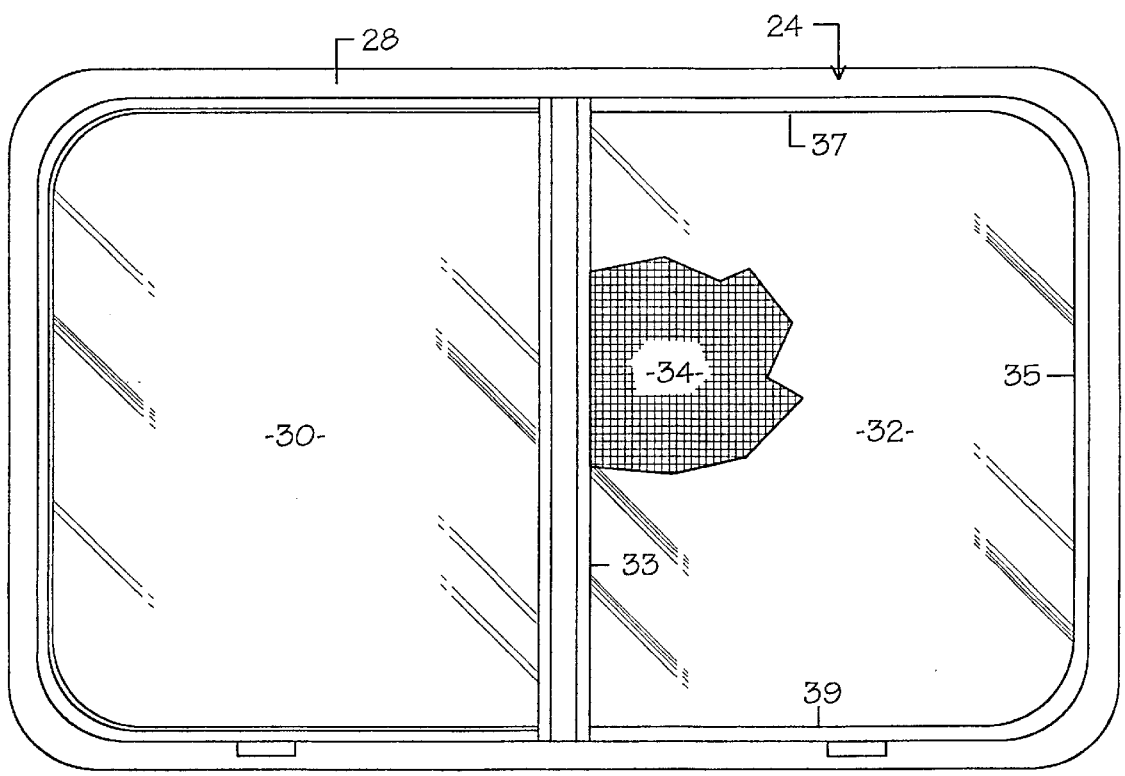
FIG. 2 is an elevation view of a typical window assembly in a recreational vehicle as seen from the outside.

The typical window 22 is shown more clearly in FIG. 2. The outer window frame assembly 24 is comprised, in part, of an outer circumferential flange 28, a fixed glass panel 30, and a slideable glass panel 32. Slideable glass panel 32 is considered to have a leading edge 33, a trailing edge 35, a top edge 37 and a bottom edge 39. On the inside of slideable glass panel 32 there exists a slideable screen 34 that is usually in a fixed position as shown.

Figure 3:
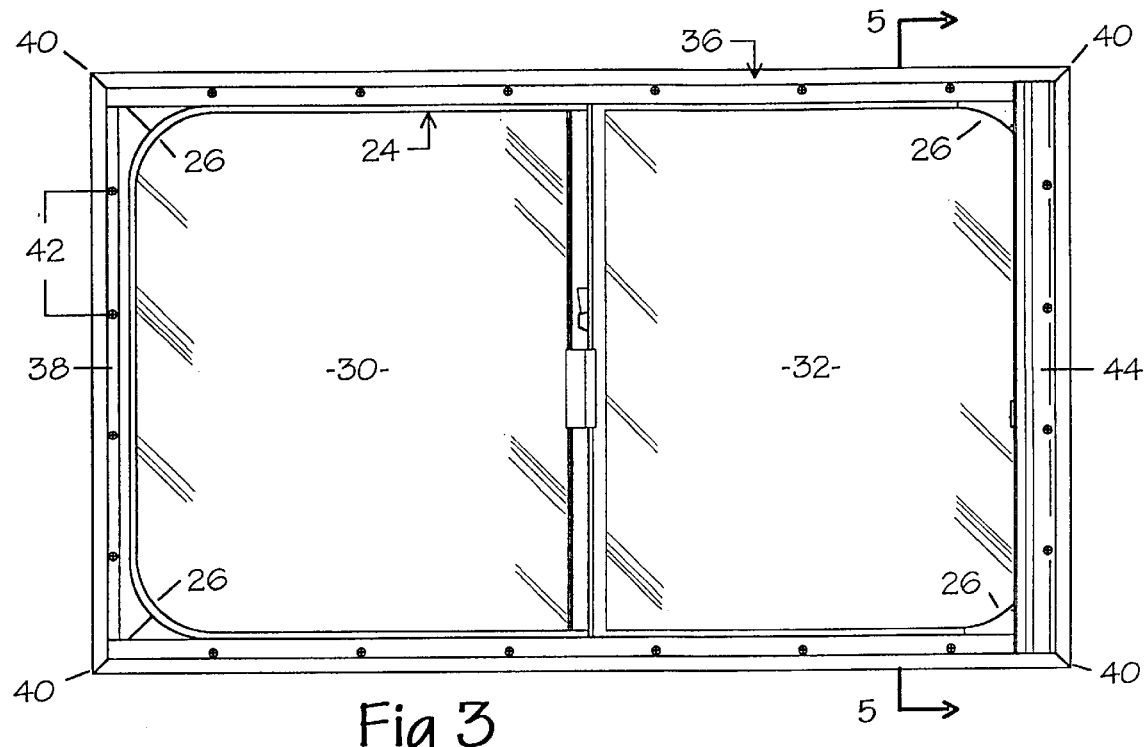
FIG. 3 is an elevation view of the inner window frame assembly with the slideable glass panel and the retractable screen in the closed position.
Figure 4:
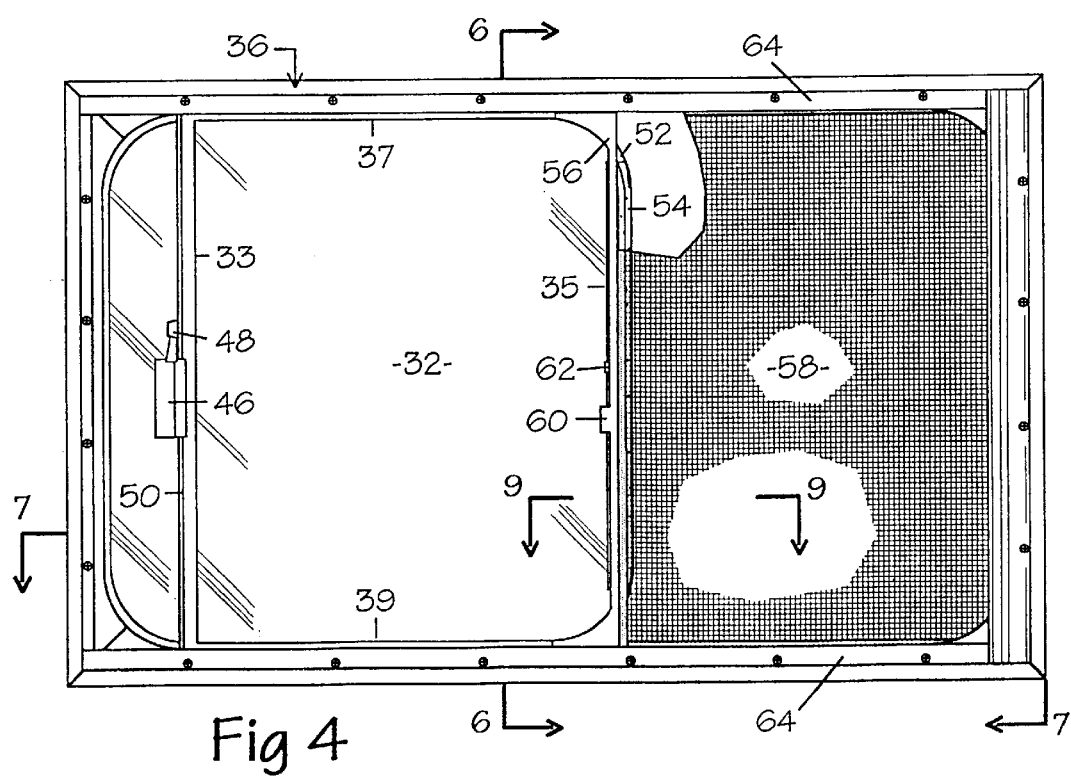
FIG. 4 is the same as FIG. 3 except the glass panel and retractable screen are in the open position.

My invention is a modification to the inside of the typical window. FIGS. 3 and 4 depict the invention in general. With reference to FIG. 3, rounded corners 26 are a part of the common outer window frame assembly 24. So is the fixed glass panel 30 and the slideable glass panel 32.

This invention is comprised of an inner window frame 36 that comprises a plurality of inner sections 38. Inner sections 38 are attached to the outer window frame assembly 24 with screws 42. When four such inner sections 38 are properly assembled, they form four square corners 40. Consequently, there is room for a generally rectangularly shaped roller housing 44 located on one side.

More details of the invention are revealed in FIG. 4 which shows the invention with slideable glass panel 32 in the open position. Leading edge 33 has a handle 46 and a locking mechanism 48, both of which are attached to the slideable glass panel by means of an inside frame member 50. My invention also utilizes an outside frame member 52, commonly employed in the manufacture of typical window 22 (FIG. 2), which is attached in circumference around the remaining three sides of the slideable glass panel and is modified.

Attached to outside frame member 52 of my invention, along the slideable glass panel's trailing edge 35, is a rigid frame attachment 54 which holds a rigid screen attachment 56. Rigid screen attachment 56, in turn, is attached to a flexible screen 58. Rigid screen attachment 56 incorporates a screen handle 60 and a screen locking mechanism 62. The invention also utilizes a plurality of screen guide rails 64 that are attached to inner window frame 36. The screen guide rails 64 are located such that they form a channel through which runs two edges of flexible screen 58.

Figure 5:
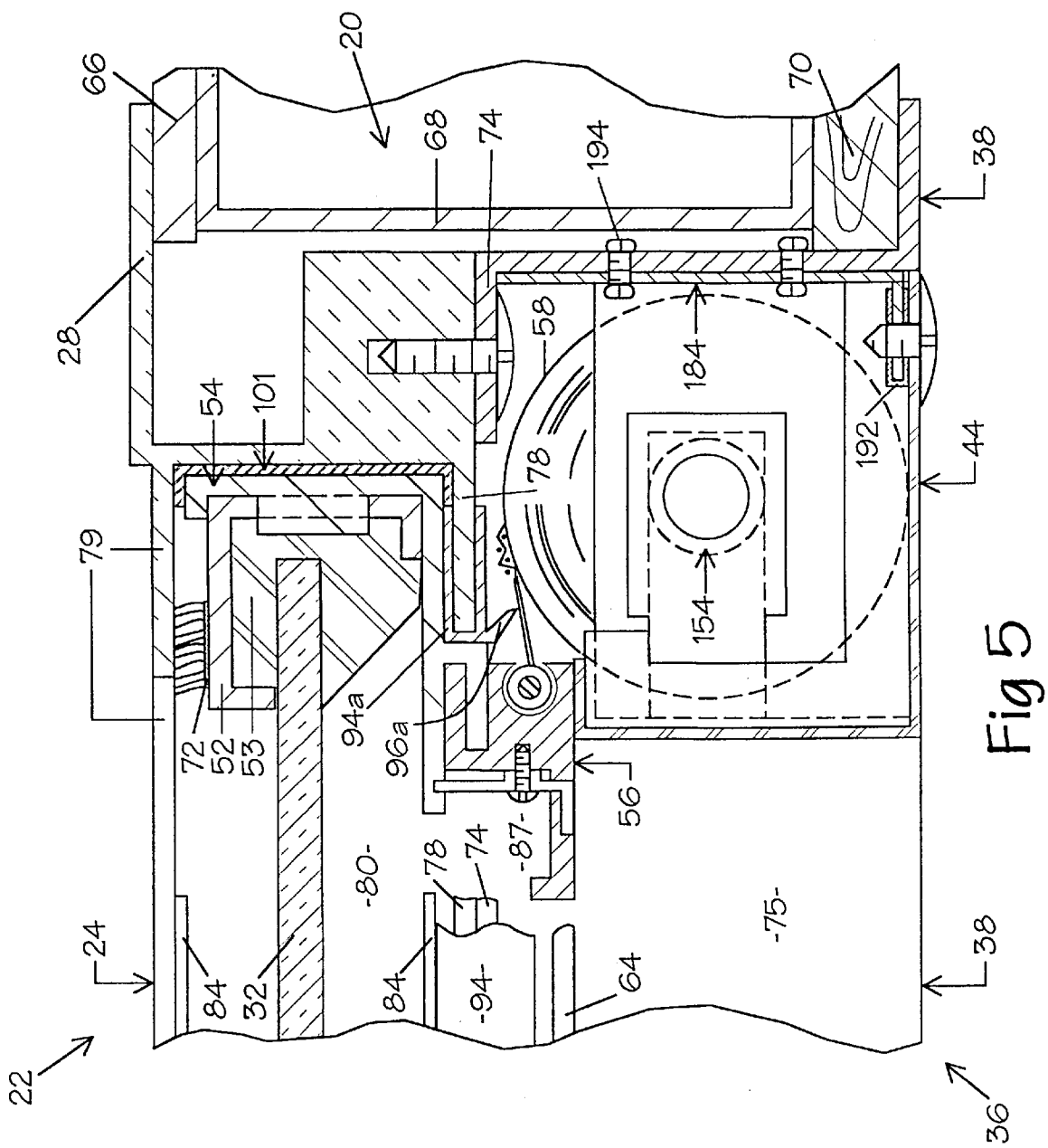
FIG. 5 is a sectional view taken along the sight-lines 5—5 of FIG. 3.
Figure 6:
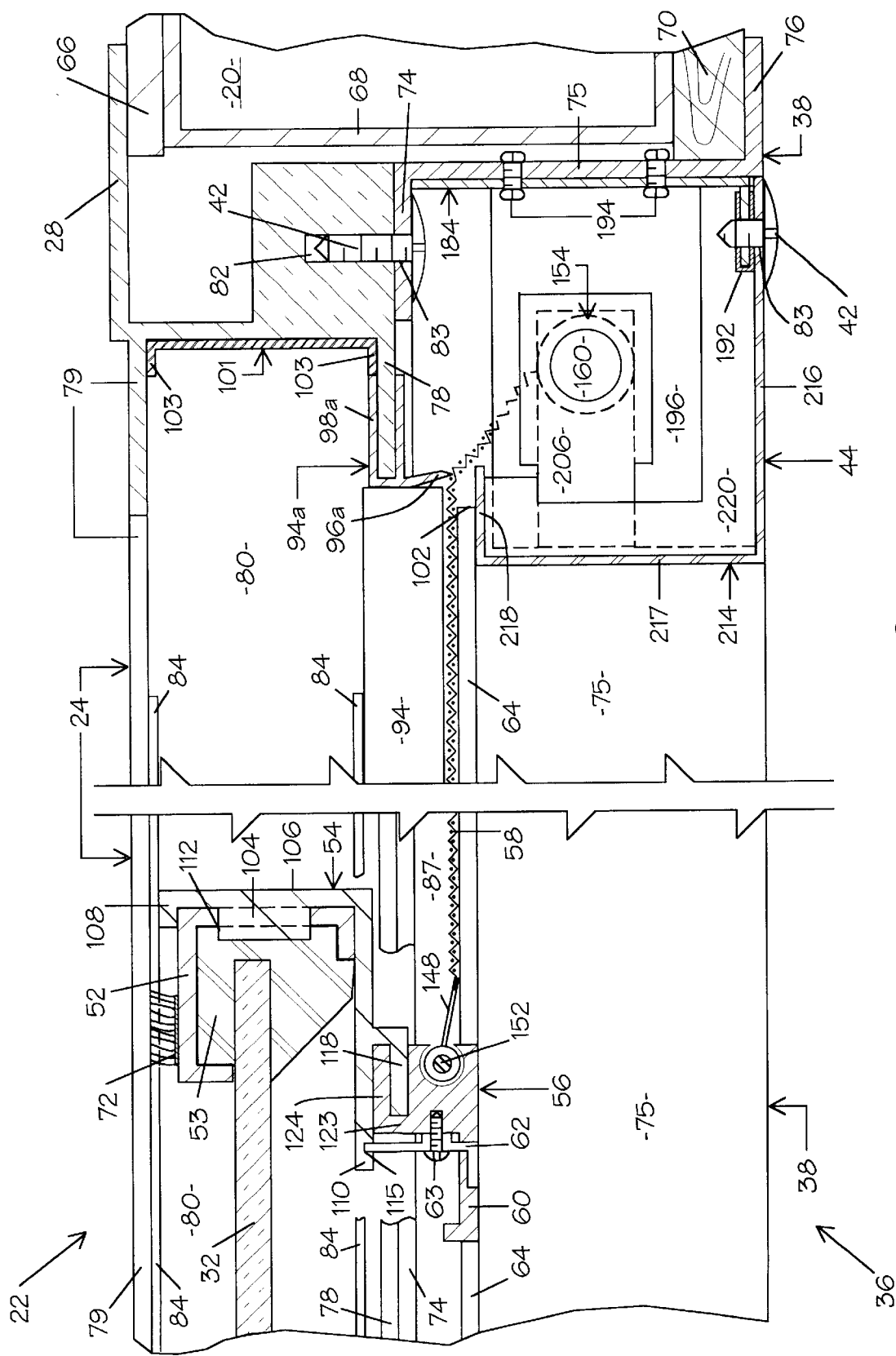
FIG. 6 is a sectional view taken along the sight-lines 6—6 of FIG. 4 with intermediate portions omitted.

FIGS. 5 and 6 illustrate the detailed interface between many of the parts that make up typical window 22 and the parts that make up this invention. RV 20 consists of an exterior wall 66, an interior frame 68 and an interior wall 70. RV 20 thus has an inside and an outside.

Orientation

The description of many parts of this invention use the terms "inner" and "outer." Those terms correspond with the inside and outside of RV 20. This description also uses the terms "inwardly" and "outwardly" to define some components of the invention. Those particular terms refer to direction. "Inwardly" refers to the middle of typical window 22. "Outwardly" refers to its outer circumference.

Outer Window Frame Assembly—FIG. 6

Referring to FIG. 6, typical window 22 utilizes a one piece outer window frame assembly 24. Outer window frame assembly 24 is comprised of a generally flat base which is considered here to form an inner window channel 80. The window channel 80 is bordered on one side by an inner parallel flange 78 and, on the other side, by an outer parallel flange 79. Both parallel flanges 78 and 79 extend inwardly in circumference around the window frame assembly 24. An outer channel, which is not shown because it does bear on my invention, holds fixed glass panel 30 (FIG. 2) while the window channel 80 holds slideable glass panel 32.

Attached around three sides of slideable glass panel 32, referring specifically to the leading edge 33, the top edge 37 and the bottom edge 39 (FIG. 2), is outside frame member 52. As FIG. 6 indicates, a sealing rubber 53 is typically used for weatherproofing and to prevent glass-to-metal contact. Also attached to outside frame member 52 is a weather strip 72.

In typical window 22, the slideable glass panel 32 is operably guided along window channel 80 by a plurality of track guides 84. The weather strip 72, through its attachment to outer frame member 52 and its contact with the inside of outer parallel flange 79, is also generally used to guide the slideable glass panel as it opens and closes. Track guides 84 are typically located such that they contact outside frame member 52 along each of the three associated edges 33, 37 and 39 (FIG. 2).

Outer window frame assembly 24 has an outer circumferential flange 28 such that when it is fit through a properly sized aperture in RV 20, the flange 28 prevents outer window frame assembly 24 from going all the way through the aperture. The outer window frame assembly 24 also contains a plurality of mounting holes 82 that are located around its inner facing circumference. The mounting holes 82 thus provide a means by which an inner section 38, or a plurality of inner sections 38, can be attached to it with fasteners, such as screws 42.

Inner Window Frame—FIG. 6

Still looking at FIG. 6, inner window frame 36, like typical window 22, can be manufactured from a material such as extruded aluminum. The inner window frame 36 replaces that which is currently used by typical window 22. It is comprised of a plurality of inner sections 38, each of which has an inwardly extending flange 74 running along its outer length, and an outwardly extending flange 76 running along its inner length. A window sill 75, which is flat, exists between the two flanges 74 and 76. Through-holes 83 are located in inwardly extending flange 74 such that they are in register with the mounting holes 82 located in outer window frame assembly 24.

Typical window 22 is designed such that when properly installed in RV 20, outer circumferential flange 28 abuts exterior wall 66. Meanwhile, on inner sections 38, outwardly extending flange 76 abuts interior wall 70. Thus, the outer window frame assembly 24, through its attachment to the plurality of inner sections 38, in effect, clamps typical window 22 to the interior and exterior surfaces of RV 20.

Figure 7:
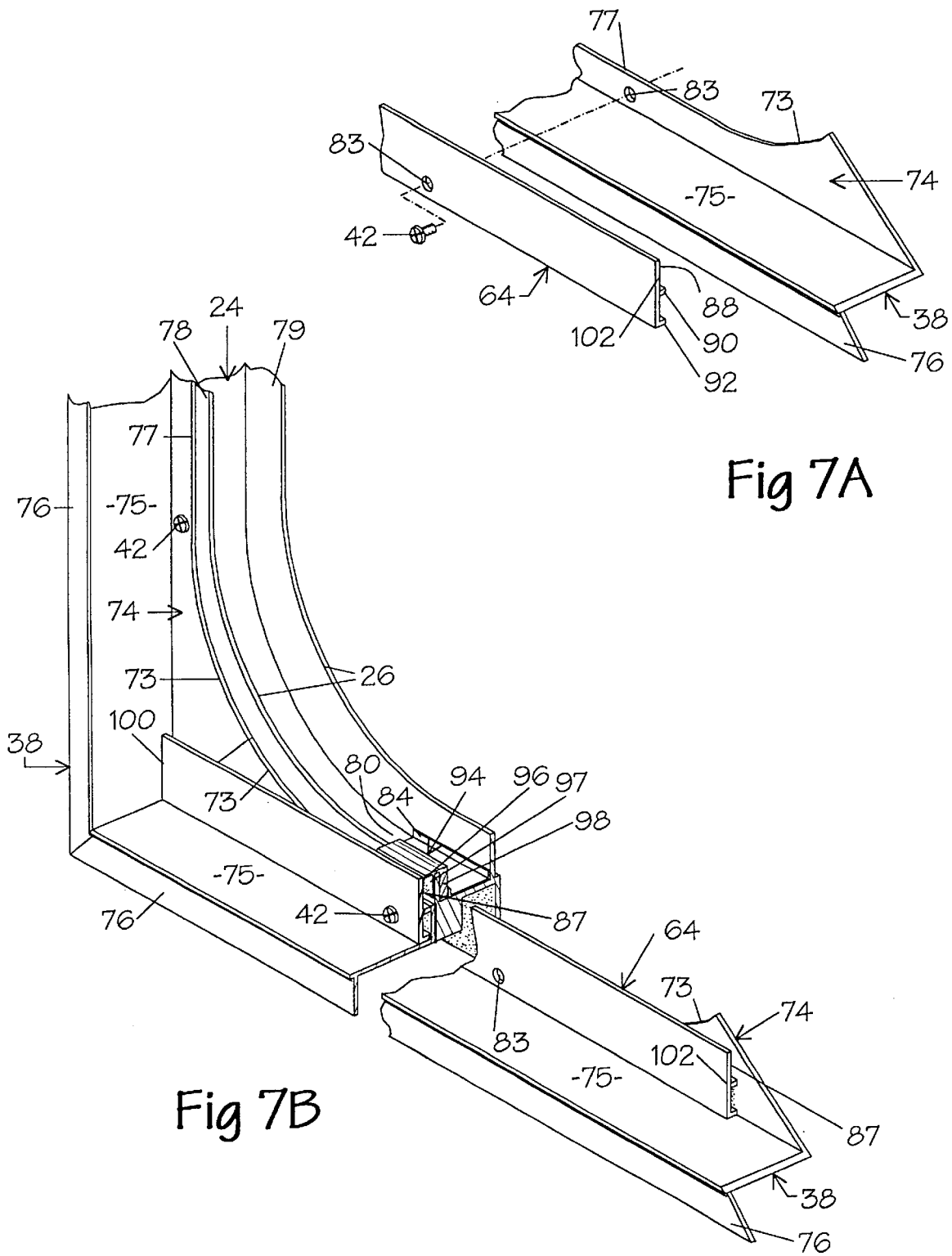
FIG. 7A is a fragmentary exploded perspective view of an inner section and guide rail.
FIG. 7B is a fragmentary perspective view, taken along the sight-line 7—7 in FIG. 4, of the inner window frame and guide rail with intermediate portions omitted and showing only a portion of the outer window frame assembly.

Inner section 38 can be seen more clearly in FIGS. 7A and 7B. The inner section has two radius edges 73 and an elongate midsection 77 that together form inwardly extending flange 74. As you follow the inwardly extending flange 74 along its elongate midsection 77 and move toward the ends, the flange 74 gradually extends more inwardly. In the process, the radius edges 73 form the same radius dimensions as the rounded corners 26 of outer window frame assembly 24.

Additionally, both elongate ends of inner section 38, including inwardly extending flange 74, window sill 75, and outwardly extending flange 76, are cut at a 45 degree angle to the plane of inner section 38. Thus, as can be seen in FIG. 7B, when two inner sections 38 are properly assembled with the outer window frame assembly 24, the resulting junction has a rounded corner where it abuts the outer window assembly 24. The window sill 75, on the other hand, has a square corner at the same junction.

When four such inner sections 38 are thus joined to form a square or rectangle the same size as outer window frame assembly 24, the four inner sections 38 form the inner window frame 36 (FIG. 4). Accordingly, the inner window frame 36 thus includes the means to attach it to the outer window frame assembly 24. Thus, while the outer window frame assembly maintains its current shape having rounded corners, the inner sections 36, in effect, mate those rounded corners with an inner window frame 36 that has square corners.

Narrow Channel for Screen—FIGS. 7A and 7B
Screen Guide Rails

Referring briefly to FIG. 4, my invention utilizes a plurality of screen guide rails 64 that are located on inner window frame 36 along the sides that are adjacent to the top and bottom edges 37 and 39 of slideable glass panel 32. FIGS. 7A and 7B depict the screen guide rails 64 more clearly.

The screen guide rails 64, which can be made from the same material as the outer window frame assembly 24, such as extruded aluminum, extend nearly the entire length of the two inner sections 38 to which they are attached. The screen guide rails 64 are comprised, in part, of a first inner side 88. First inner side 88 is of a height that, when properly assembled with the outer window frame assembly 24, equals, or slightly exceeds, the inwardly measured height of the inner parallel flange 78.

The screen guide rail 64 also comprises an elongate first outer extending flange 90 that is perpendicular to the first inner side 88. The first outer extending flange 90 is located such that when it is assembled with both the inner window frame 36 and outer window frame assembly 24, its most inwardly facing surface is of a height that is equal to the bottom of window channel 80.

Screen guide rail 64 comprises an elongate second outer extending flange 92 that is located at the base of the first inner side 88. The second flange 92 is of the same length and width as its neighbor, the first outer extending flange 90. Thus, in cross-section, the screen guide rail 64 is generally U-shaped with a wing extending from its base.

Additionally, the first inner side 88 has evenly spaced through-holes 83 that are in register with through-holes 83 located in inner section 38 along the inwardly extending parallel flange 74. On screen guide rail 64, the through-holes 83 are located between the two flanges 90 and 92. Thus, as can be seen in FIG. 7B, when attached to the outer window frame assembly 24 in conjunction with the inner section 38 by means of screws 42, a narrow screen channel 87 is formed between first inner side 88 and the inner parallel flange 78. Furthermore, the screws 42 not only attach the screen guide rail 64 to the inner window frame 36, they also serve to attach the inner window frame to the outer window frame assembly 24.

It can be seen in FIG. 7B that screen guide rail 64 does not extend the entire length of inner section 38. It can be said that screen guide rail 64 comprises two ends, an open end 100 and a housing end 102. The open end 100 can extend to the square corner formed at the junction of the window sills 75. On the housing end 102, however, the guide rail 64 extends to a length that is less than the length of inner section 38. It can be seen in FIG. 6 that the housing end 102 thus allows the flexible screen 58 to enter the narrow screen channel 87.

Sealing Rubber—FIG. 7B

Figure 8:
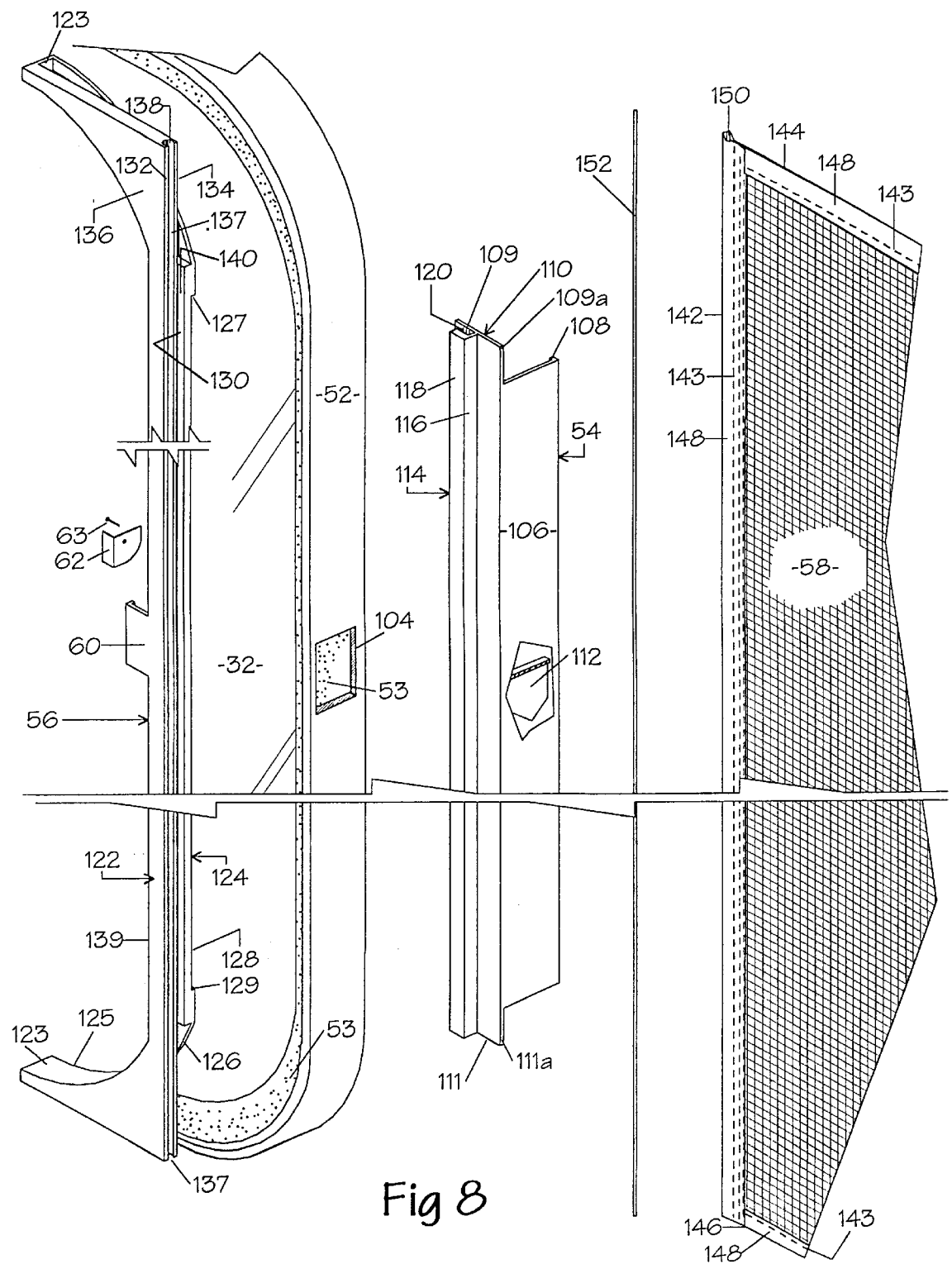
FIG. 8 is an exploded fragmentary perspective view, with intermediate portions omitted, of the components which are used to attach the flexible screen to the slidable glass panel.

Getting back to FIG. 7B, my invention includes a length of sealing rubber 94 that is attached to the outer window frame assembly 24 along the inner parallel flange 78. The sealing rubber 94 extends along the two sides of the window frame assembly that are adjacent to the slideable glass panel's top and bottom edges 37 and 39 (FIG. 4). When the invention is completely assembled, the sealing rubber 94 can be seen to extend no further along the rounded corner than to where it meets the top and bottom edges 109 and 111 of the rigid frame attachment 54 (FIG. 8).

The sealing rubber 94 is generally U-shaped, comprises a top side 96 that forms the base of the U, and is of such a gauge that it is flexible. Sealing rubber 94 has a first outwardly extending flange 97 forming one leg of the U and a second outwardly extending flange 98 that forms the second leg of the U. The second outwardly extending flange 98 can be wide enough to fill in the gap between the inner parallel flange 78 and the track guide 84, thus blocking that route from incursion by bugs.

Additionally, the top side 96 comprises a wing that, when properly attached to the outer window frame section 24, covers the narrow screen channel 87. As was stated previously, the first inner side 88 of the screen guide rail 64 can extend inwardly a bit further than the inner parallel flange 78. The sealing rubber 94, once it is fitted onto the inner parallel flange 78, can make up the difference in the disparate heights. Thus, the top side 96 forms a surface that is relatively level with the adjacent edge of the first inner side 88. By briefly referring ahead to FIG. 9, it can also be seen that the top side 96 may act as a bug deterrent and may, as well, act to hold the edge of the flexible screen 58 in place in the narrow screen channel 87 when the window is open.

Additional Sealing Rubber—FIGS. 5 and 6

It can be seen in FIGS. 5 and 6 that my invention can utilize an additional sealing rubber 94a that can be attached to the outer window frame assembly 24 along the inner parallel flange 78. The additional sealing rubber 94a extends along the side of the window frame assembly that is adjacent to the slideable glass panel's trailing edge 35 (FIG. 4) when the window is in the closed position. The additional sealing rubber 94a is generally the same shape as sealing rubber 94.

Thus it includes, at least, a top side 94*a* and a second outwardly extending flange 98*a*.

When assembled, the top side 94*a* can extend further away from the inner parallel flange 78 than does its counterpart on sealing rubber 94. That is because a larger gap may exist between the additional sealing rubber 94*a* and the flexible screen material 58 when the window is in its open position (FIG. 6). It can be seen that the additional sealing rubber 94*a* is located adjacent to the roller housing 44.

The second outwardly extending flange 98*a* is not as wide as the outwardly extending flange 98 (FIG. 7B) that forms a part of sealing rubber 94. That is because my invention utilizes a modified track guide 101 that is wider than the track guides 84 used in typical window 22. The modified track guide 101 is not explained in detail here. Its use, design and manufacture ultimately depend on the specific design of the particular typical window 22 that incorporates this invention. Each manufacturer of typical window 22 may use a design that varies from what is depicted here. Therefore, the ultimate shape of the modified track guide 101 will depend on the manufacturer.

That said, and still in FIG. 6, the modified track guide 101 partly comprises two inwardly extending flanges 103. The modified track guide 101 is wider between the two inwardly extending flanges 103 than the corresponding flanges on track guide 84 (FIG. 7B). Referring to FIG. 5, the modified track guide 101 is wide enough to accept that portion of the rigid frame attachment 54 with which it has contact when the slideable glass panel 32 is in the closed position.

One additional detail about the second outwardly extending flange 98*a*: Its width is dictated by the modified track guide 101. It does not extend beyond the innermost inwardly extending flange 103. Thus, the second outwardly extending flange 98*a* does not interfere with the movement of the slideable glass panel 32 when it is opened and closed.

Slideable Glass Panel Frame—FIG. 8

Typical window 22 generally includes an outside frame member that is attached in circumference around the slideable glass panel 32. Referring to FIG. 8, my invention calls for outside frame member 52 to be modified such that it has a plurality of receptacles 104. The receptacles 104 are located on the side that is adjacent to the trailing edge 35 (FIG. 4) of the slideable glass panel 32.

Rigid Frame Attachment—FIG. 8

Still referring to FIG. 8, this invention includes a rigid frame attachment 54 that can be made from the same material as the rest of the window assembly. Rigid frame attachment 54 comprises an elongate first side 106 that is flat on its outwardly facing side. On its inwardly facing side, first side 106 contains a plurality of protuberances 112 that project away from the first side 106 and point downwards. Accordingly, the protuberances 112 thus form a relationship with receptacles 104 that extends as to the one and receives as to the other.

The length of first side 106 is dictated by that portion of outside frame member 52 which exists between the two rounded corners. The first side 106 comprises an inwardly extending flange 108 that runs the length of its outer edge. Along the opposite edge, it further comprises a second side 110 that is parallel with flange 108. The second side 110 can be longer in length than first side 106. As can be noted in FIG. 6, measured between the flange 108 and the second side 110, the first side 106 is as wide as the outside frame member 52 to which it attaches.

Turning again to FIG. 8, second side 110 comprises an elongate inner extending protuberance 114. The inner extending protuberance 114 has a base side 116 that is perpendicular to the second side 110. It also has an extending side 118 that, when considered with the base and second sides, forms a channel 120 that runs the length of the second side.

Second side 110 also contains a groove, or slot 115, that is shown in FIG. 6. The slot 115 can be located about midway along the length of second side 110 and further positioned so that it is near the second side's inwardly facing edge.

Second side 110 is considered to have a top edge 109 and a bottom edge 111 (FIG. 8). By briefly referring to FIG. 9, the outwardly facing corners 109*a* (not shown) and 111*a* can be slightly rounded such that, when the rigid frame attachment 54 is properly assembled with the outside frame member 52, the rounded corners 109*a* (not shown) and 111*a* form a uniform edge with the outside frame member's rounded corners.

Rigid Screen Attachment—FIG. 8

Getting back to FIG. 8, my invention utilizes an elongate rigid screen attachment 56 that holds one end of the flexible screen 58. It also attaches to outside frame member 52 by means of the rigid frame attachment 54. The rigid screen attachment 56 has an inner side 122 and an outer side 124. The two sides 122 and 124 are connected to each other by a base side 123.

The outer side 124 is considered to have an inwardly facing edge 125, an outwardly facing edge 126, an outer facing surface 128, and an inner facing surface 130. Both the inwardly and outwardly facing edges 125 and 126 are flat along most of their length. At their elongate ends however, the edges take on a radius that is the same dimension as the rounded corners of outer frame member 52. At the elongate ends, the outer side 124 extends inwardly for a distance that is at least equal to the rounded corner on the outer frame member 52 to which it is adjacent.

Still referring to FIG. 8 and outer side 124 of the rigid screen attachment, the outer facing surface 128 is indented along most of its length. It can be said that the outer facing surface 128 thus has a top indentation ridge 127 and a bottom indentation ridge 129. The distance between the two indentation ridges corresponds with the length of the rigid frame attachment's second side 110.

The inner facing surface 130 of outer side 124 is flat along most of its length. Accordingly, the outer side 124 thus forms a relationship with the channel 120 on the rigid frame attachment such that one is extending and the other is receiving. Additionally, when properly assembled, the second side 110 of the rigid frame attachment fits between the top and bottom indentation ridges 127 and 129 on the rigid screen attachment, thus preventing longitudinal slippage.

Inner side 122, like outer side 124, is considered to have an outwardly facing edge 132, an outer facing surface 134, and an inner facing surface 136. The length of the outwardly facing edge 132 is determined by the distance between the two most inwardly facing edges of the screen guide rails 64 (FIG. 4). Indeed, the maximum length of the rigid screen attachment as a whole is predetermined by that measurement. As FIG. 8 shows, outer facing edge 132 contains a slot 137 running its entire length. The slot gives way to a circular channel 138 that has a diameter greater than the measurement of the open slot 137.

The outer facing surface 134 is flat. When the outer facing surface 134 is considered with base side 123 and inner facing surface 130, a channel 140 can be seen to exist. The channel 140 forms a relationship with the extending side 118 on the rigid frame member 54 that receives as to one and extends as to the other.

Still referring to the rigid screen member as depicted in FIG. 8 and its inner side 122, the inner facing surface 136 has an inwardly facing edge 139. About midway along the length of the inwardly facing edge 139, a screen handle 60 extends further inwardly. Located near the screen handle 60, a screen latch 62 is attached to the inner side by means of a fastener, a screw 63 for example. The location of screen latch 62 corresponds with the slot 115 (FIG. 6) located in the rigid frame member 54.

Although inwardly facing edge 139 is generally flat along most of its length, it takes on a radius shape at its elongate ends. The radius is the same dimension as the rounded corners of outer frame member 52 and extending the same inward distance as the other inwardly facing edge 125. The base side 123 forms a flat surface between the two that follows the same radius contour.

Figure 9:
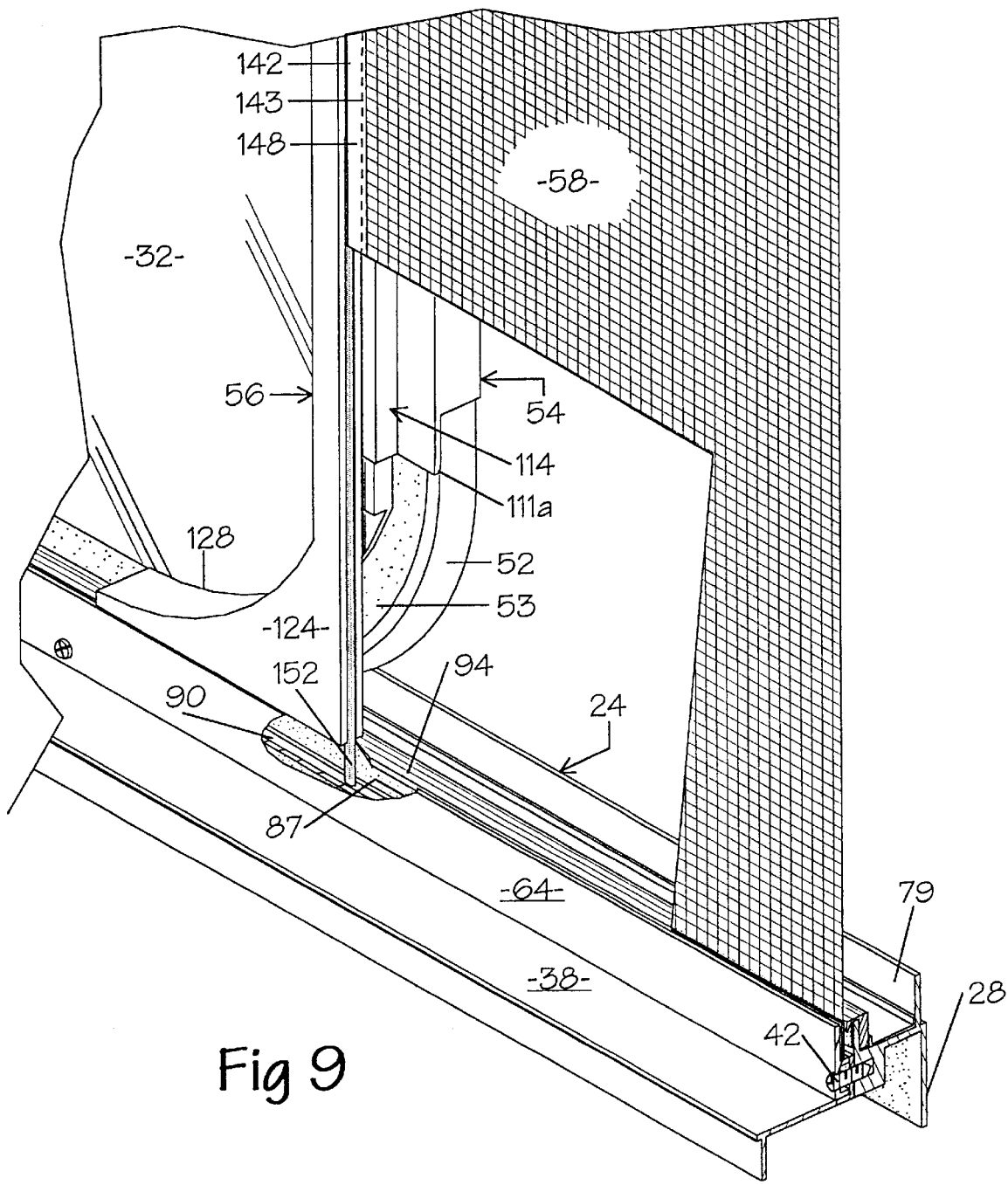
FIG. 9 is a fragmentary perspective view, taken along the sight-lines 9—9 in FIG. 4.

It can be seen that the elongate ends of rigid screen attachment 56 are shaped somewhat like a wedge or a buttress. FIG. 9 depicts the rigid screen attachment properly assembled with its corresponding components. The elongate end of the outer facing surface 128 abuts, or nearly abuts, the sealing rubber 53 surrounding slideable glass panel 32. Meanwhile, the width of the buttress shaped end, covers the exposed gap between the sealing rubber 53 and the rigid screen attachment's outer side 124. Consequently, with the gap thus closed, bugs are out of luck entry-wise.

Flexible Screen—FIG. 8

Back to FIG. 8, the flexible screen 58, such as mosquito netting, has two sides and consists of four edges. The flexible screen 58 is generally square or rectangular in shape with square corners. The flexible screen 58 comprises a first edge 142. The first edge 142 is about the same length as the window assembly when measured between the bottom opposing surfaces of the narrow screen channels, formed by the screen guide rails 64 (FIG. 4). The second and third edges 144 and 146 are perpendicular to the first edge 142. Measured along either the second or third edges, flexible screen 58 is slightly wider than the window opening when slideable glass panel 32 is in its open position.

A flexible material 148 can be attached along the first edge 142 by means of stitching 143. A fabric, perhaps a light weight canvas or a thin nylon material such as Ripstop, can be used as the flexible material 148. The flexible material can be attached to both sides of the flexible screen 58 such that, when attached, it contains an elongate open loop 150 that extends the length of the first edge 142. A semi-rigid circular shaped member, such as a flexible plastic or hard rubber rod 152, which is the same length as the first edge 142, can be fit inside the open loop 150. Thus, as can be seen in FIG. 9, the first edge 142 can be fit snugly into circular channel 138 in the rigid screen attachment.

Referring again to FIG. 8, the second and third edges 144 and 146 of the flexible screen can have the same type of flexible material 148 attached to them with stitching 143. The flexible material 143 thus provides protection against chafe or fraying of the flexible screen 58 when it operably slides through the narrow screen channel 87 (FIG. 9). The flexible material 148 does not need to be attached to the fourth edge of the flexible screen (not shown), which attaches to a roller assembly and brings us to FIGS. 10A and 10B.

Roller Assembly—FIGS. 10A, 10B, & 10C, and FIGS. 11A & 11B

My invention can utilize a choice of compact roller assemblies 154 or 154a that store the flexible screen 58 when the slideable glass panel is in the closed position. Furthermore, the semi-monocoque roller assembly 154, and the monocoque roller assembly 154a, are both designed such that the flexible screen can be easily removed from either of them without the marring or permanent deformation of any of their components.

Figure 10A:
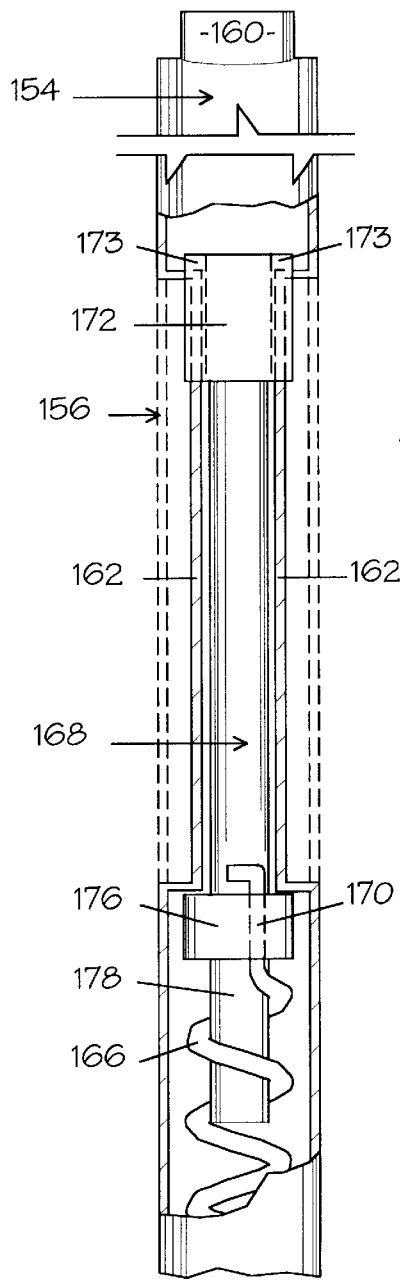
FIG. 10A is a fragmentary elevation view, partially in section, of the upper semi-monocoque roller assembly.
Figure 10B:
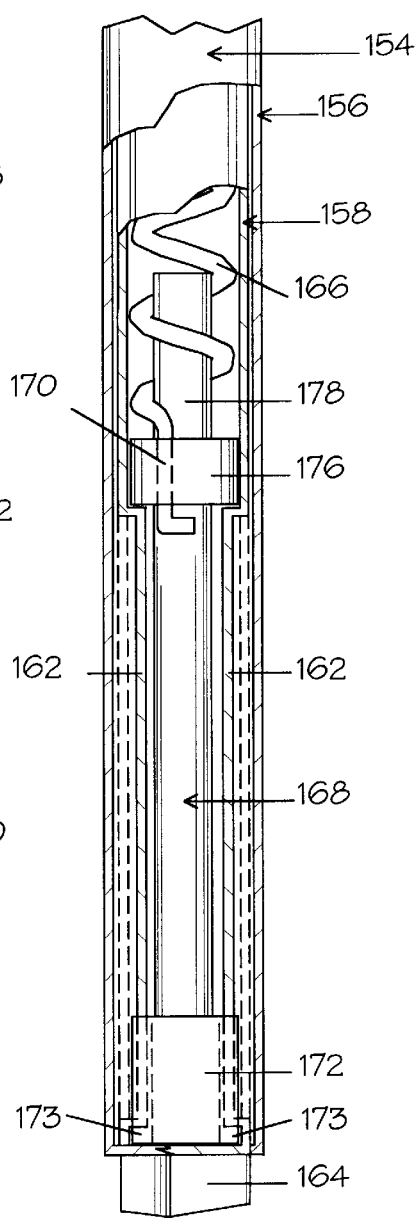
FIG. 10B is a fragmentary elevation view, partially in section, of the lower semi-monocoque roller assembly with the upper roller tube encasing it.

Semi-Monocoque Tube Assembly—FIGS. 10A and 10B

In the semi-monocoque embodiment, roller assembly 154 comprises a plurality of elongate tube sections: an upper tube section 156 and a lower tube section 158. The tube sections 156 and 158 are cylindrical in shape. In the compact embodiment herein described, the tube sections 156 and 158 can be formed, such as by pressing, from a thin gauge metal that is no thicker than 0.4 mm (1/64 in). The embodiment described herein, by utilizing such a thin gauge material, utilizes an upper tube section 156 that has an outside diameter of 8 mm (5/16 in). Both tubes 156 and 158 are hollow and each has an open end and a closed end.

FIG. 10A shows a sectional view of upper tube section 156. The length of the tube is determined by the distance between a pair of mounting plates 206 and 208 (FIG. 14) when they are assembled in final form.

As indicated in FIG. 10A, upper tube section 156 has a circular closed end 160. The diameter of the circular closed end 160 is smaller than the diameter of the rest of the upper tube section 156. In the embodiment described herein, for example, circular closed end 160 has a diameter of 6.4 mm (1/4 in). The circular closed end 160 is of a height such that it does not exceed the thickness of the upper mounting plate 206 (FIG. 14) to which it is finally assembled.

Figure 10C:
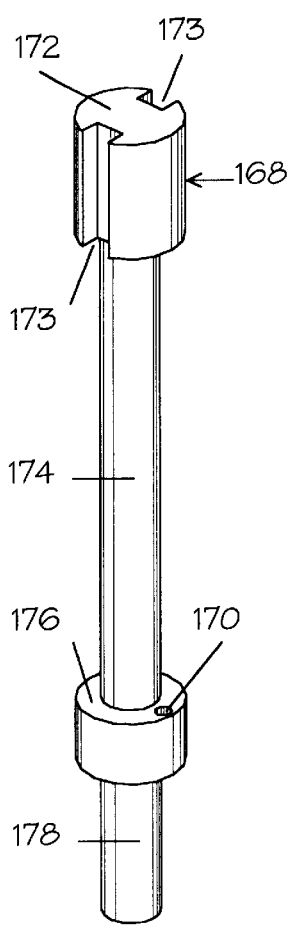
FIG. 10C is an enlarged perspective view of a spring anchor.

Punched or otherwise formed into the upper tube section 156 are one or more elongate anchor rails 162. The anchor rails 162 are located opposite each other. They extend into the hollow interior of the upper tube section 156 to a depth such that they nearly contact an intermediate shaft 174 located on a spring anchor 168 (FIG. 10C). The anchor rail 162 is located near that elongate end of the upper tube section that is closed.

FIG. 10B shows the lower tube section 158 in assembly with the upper tube section 156. The lower tube section 158 has an outside diameter that equals, or is slightly less than, the inside diameter of the upper tube section 156. Thus, the lower tube section 158 is able to reside inside upper tube section 156. The length of lower tube section 158 does not have to be any more than half as long as the upper tube section 156. Thus, the lower tube section 158 will support the upper tube section 156 if the roller assembly 154 is mounted horizontally.

Figure 13:
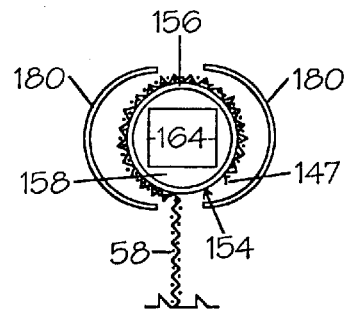
FIG. 13 is an elevation view of the roller assembly, as seen looking at the lower tube section, with the screen material in place between the upper tube section and the screen holders.

Lower roller tube section 158 has a rectangular or square closed end 164. The dimensions of the square closed end 164 can be such that none of the sides or corners extend beyond the circumference of the circular shaped portion of the lower tube section 158 (FIG. 13). The height of the square closed end is determined by the thickness of the lower mounting plate 208 (FIG. 14) to which it is finally assembled. Incidently, when finally assembled, the upper tube section 156 is long enough to meet the end of lower tube section 158 at the point where its rounded shape transforms to the square closed end 164.

Punched or otherwise formed into the lower tube section 158 are one or more elongate anchor rails 162. The anchor rails 162 are located opposite each other. They extend into the hollow interior of the lower tube section to a depth such that they nearly contact the intermediate shaft 174 located on the spring anchor 168 (FIG. 10C). The anchor rail 162 is located near that end of the lower tube section that is closed. Additionally, they are positioned in each of the tube sections 156 and 158 such that they do not interfere with the free rotation of the upper tube section around the lower tube section, which forms the axis.

Spring Assembly—FIGS. 10A, 10B, and 10C

The roller assembly 154 also comprises a coil spring 166 and a plurality of spring anchors 168. The spring 166 has an outside diameter that allows it to fit inside the hollow interior of lower tube section 158. The ends of the spring 166 extend outwardly along the spring's axis such that they can fit through a hole 170 in the spring anchor 168. The ends of the spring 166 can be bent over as illustrated to more firmly secure the spring to the spring anchor.

The spring anchor 168 can be seen most clearly in FIG. 10C. The spring anchor 168 comprises a rail hold 172, the intermediate shaft 174, a spring hold 176, and a spring shaft 178. It can be manufactured using a hard plastic type material.

The rail hold 172 is located at an elongate end of the spring anchor 168. The rail hold 172 is generally cylindrical in shape with a diameter generally equal to the inside diameter of lower tube section 158. The rail anchor contains a plurality of grooves or slots 173. The width of the slots 173 is determined by the width of the anchor rails 162, located in tube sections 156 and 158. The slots 173 form a relationship with the anchor rails 162 that receive as to one and extend as to the other.

The spring hold 176 is separated from the rail hold 172 by the intermediate shaft 174. The spring hold 176 is cylindrical in shape and is of the same general diameter as the rail hold 172. A hole 170 is located in the spring hold 176 of a size that will accommodate either end of the spring 166.

The spring shaft 178 is located on the elongate end of the spring anchor 168 that is opposite the rail hold 172. The diameter of the spring shaft is such that it can be fit within the coil wrappings of the spring 166 and thus help to stabilize it. The intermediate shaft 174 and the spring shaft 178 can have the same diameter.

To those skilled it the art, it shall be appreciated that the roller assembly 154 is substantially different than a typical roller mechanism most commonly employed in prior art. Common roller mechanisms typically comprise an inner shaft that is surrounded by a coil spring and around which the other components rotate. The shaft and spring assembly is then typically encased in a roller tube which has separate end caps. Consequently, it can be said that the typical roller mechanism comprises an inner frame and an outer body.

My invention can utilize a roller assembly 154 that employees a semi-monocoque design. The upper tube section 156 is able to revolve around the lower tube section 158, provided that the lower tube section is prevented from rotating. Inside the upper tube section, the spring anchor 168 fixes the spring 166 to the tube section through its relationship with the anchor rails 162. A second spring anchor 168 provides the same function relative to the lower tube section. Thus, when the upper tube section 156 is rotated in a direction to wind the spring, a biasing force is placed on it. Accordingly, the biasing force will tend to return the upper tube section 156 to the position wherein the spring is unwound.

It shall be noted that as the spring 166 is wound and unwound, the spring may contract and expand accordingly. The anchor rails 162, together with the combined intermediate shaft 174 and the rail hold 172, are of such lengths such that the contraction and expansion will not cause the spring anchor 168 to lose its grip on the anchor rails 162.

Furthermore, the spring hold 176 does not contain any slots 173. In addition, it is of a size such that the inwardly extending anchor rails 162 will prevent the spring anchor 168, as a whole, from traveling beyond a certain length inside the tube section 156 or 158. Thus the spring anchor 168 will not lose its grip with the anchor rails 162 when it is inserted into the tube during assembly.

Monocoque Roller Assembly—FIGS. 11A and 11B

While the semi-monocoque roller assembly 154 is compact enough to fit within the confines of the inner window frame 36, the monocoque roller assembly 154a meets the same design criteria but utilizes fewer parts. FIGS. 11A and 11B show the roller assembly 154a in detail.

The roller assembly 154a utilizes a hollow roller tube 226 which encloses a spiral or coil spring 166a. The roller tube 226 can be made from the same material, and be of the same general gauge and dimensions, as described for the upper tube section 156 (FIG. 10A). However, unlike the upper tube section 156, roller tube 226 is open at both elongate ends.

Punched or otherwise formed into the roller tube, near one of the ends, is a V-shaped spring holder 232. The spring holder 232 extends deep enough into the tube to allow one end of the spring 166a to pass through the opening created by the V-shape.

The roller assembly 154a utilizes a pair of mounting plates 209 that serve to provide more than one function. The mounting plates 209 attach the roller assembly to the window frame as described below under the heading "Roller Mount and Housing—FIG. 14." However, they also provide the means which allow the roller to rotate and to retract as well. The mounting plates 209 can be manufactured from a hard plastic material so as to reduce noise from vibration when the invention is used in a motor vehicle. They can be generally hollow inside. The hollow interiors can be sealed with a rubber plug or an adhesive tape 234 to prevent the infiltration of dust or dirt.

The mounting plates 209 comprise a plurality of surfaces 202, 203 and 204. Those surfaces relate to the means by which the roller assembly 154a is attached to the inner window frame. Those portions of the mounting plate are described in detail below under the heading "Roller Mount and Housing—FIG. 14." The rest of the mounting plate 209 relates to the functionality of the roller assembly 154a. Accordingly, I will talk about those features now.

The mounting plates 209 are designed such that they can be fit into either end of the roller tube 226. Toward that end, the mounting plates 209 comprise an axle shaft 228 which extends inwardly from one of the mounting surfaces. The axle shaft 228 is cylindrical in shape. It has the same outside diameter, or is slightly smaller than, the inside diameter of the roller tube 226. Thus, the roller tube 226 can rotate freely around the axle shaft 228 when all of the components are finally assembled.

The mounting plate 209 further comprises a spring support 230 that is located at the end of the axle shaft opposite the mounting surface. The spring support 230 is also cylindrical in shape. It has the same general outside diameter as the inside diameter of the spring 166a. Thus, when the spring support 230 is inserted into one end of the coil spring 166a, it can be seen to provide the spring with a degree of stability.

The elongate ends of the spring 166a are considered to have a bottom end 236 and a top end 238. As can be seen in FIG. 11B, the bottom end 236 is long enough such that it can fit through a hole 170 which can be located in the spring support 230. Thus positioned, the bottom end 236 will be firmly secured to the mounting plate 209. Furthermore, the inside wall of the roller tube 226 will prohibit the bottom end 236 of the spring from becoming detached when the assembly is together in final form.

The top end 238 of the spring 166a extends outwardly along the axis of the spring. The top end 238 passes through the V-shaped spring holder 232, thus securing it to the roller tube 226.

By combining the roller tube, the spring, and the two mounting plates, a roller mechanism can be seen to exist that is substantially different than that used in prior art. The roller tube 226 is able to revolve around the axle shafts 228 that are a part of the mounting plates 209. Inside the roller tube, one end of the spring 166*a* is attached to the tube while the other end is attached to the mounting plate 209. Thus, when the roller tube 226 is rotated in a direction to wind the spring, a biasing force is placed on it. Accordingly, the biasing force will tend to return the roller tube 226 to the position wherein the spring is unwound.

It shall be noted that as the spring 166*a* is wound and unwound, it may contract and expand accordingly. However, the top end 238 of the spring is long enough such that the contraction and expansion will not cause the spring to lose its contact within the V-shaped spring holder 232. That end of the spring will merely slide within the opening provided by the V-shape.

Figure 12:
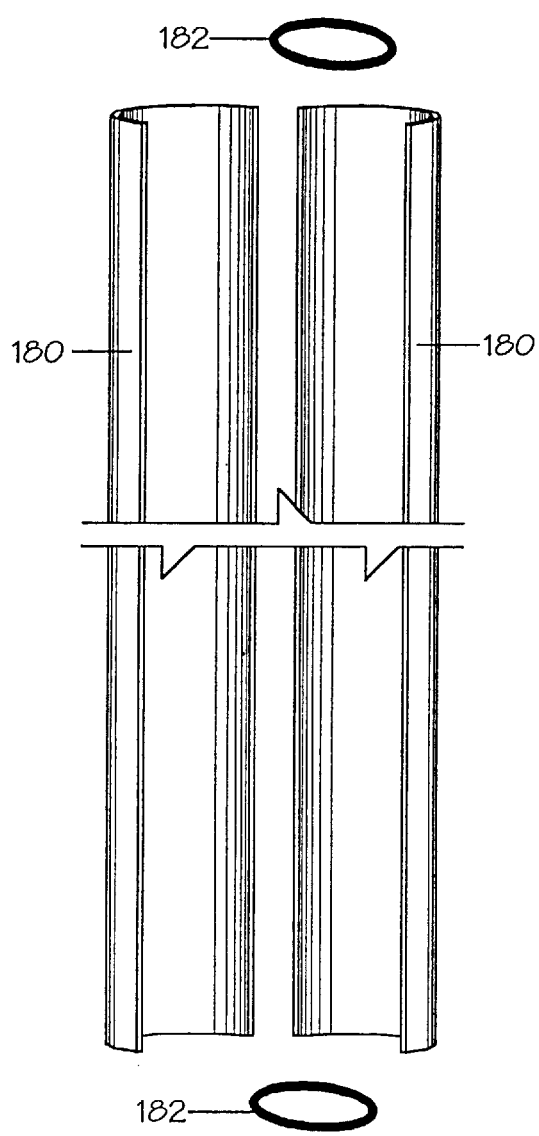
FIG. 12 is an exploded perspective view of the screen holder assembly with intermediate portions omitted.

Screen Holder—FIGS. 12 and 13

FIGS. 12 and 13 depict one embodiment of this invention whereby the flexible screen 58 is attached to the roller assembly. My invention can utilize a plurality of screen holders 180. The elongate screen holders 180 can be made from the same material as the tube sections 156 and 158, or the roller tube 226. The screen holder 180 is semi-circular in shape. It is generally as long as upper tube section 156 (or roller tube 226). When two such screen holders 180 are placed together along their lengths, they generally form the shape of a tube. The inside diameter of the resulting tube is slightly larger than the outside diameter of upper tube section 156 (or roller tube 226) around which it is assembled.

As can be seen in FIG. 13, flexible screen 58 is considered to have a fourth edge 147. The fourth edge 147 can be wrapped around upper tube section 156 (or roller tube 226) then held in place by the screen holders 180. The screen holders 180 themselves can be secured to the upper tube section (or roller tube 226) by means of elastic bands 182 (FIG. 12). The elastic bands 182 can be placed at the elongate ends of the screen holders 180 such that they do not contact the flexible screen's second and third edges 144 and 146 (FIG. 14).

Figure 14:
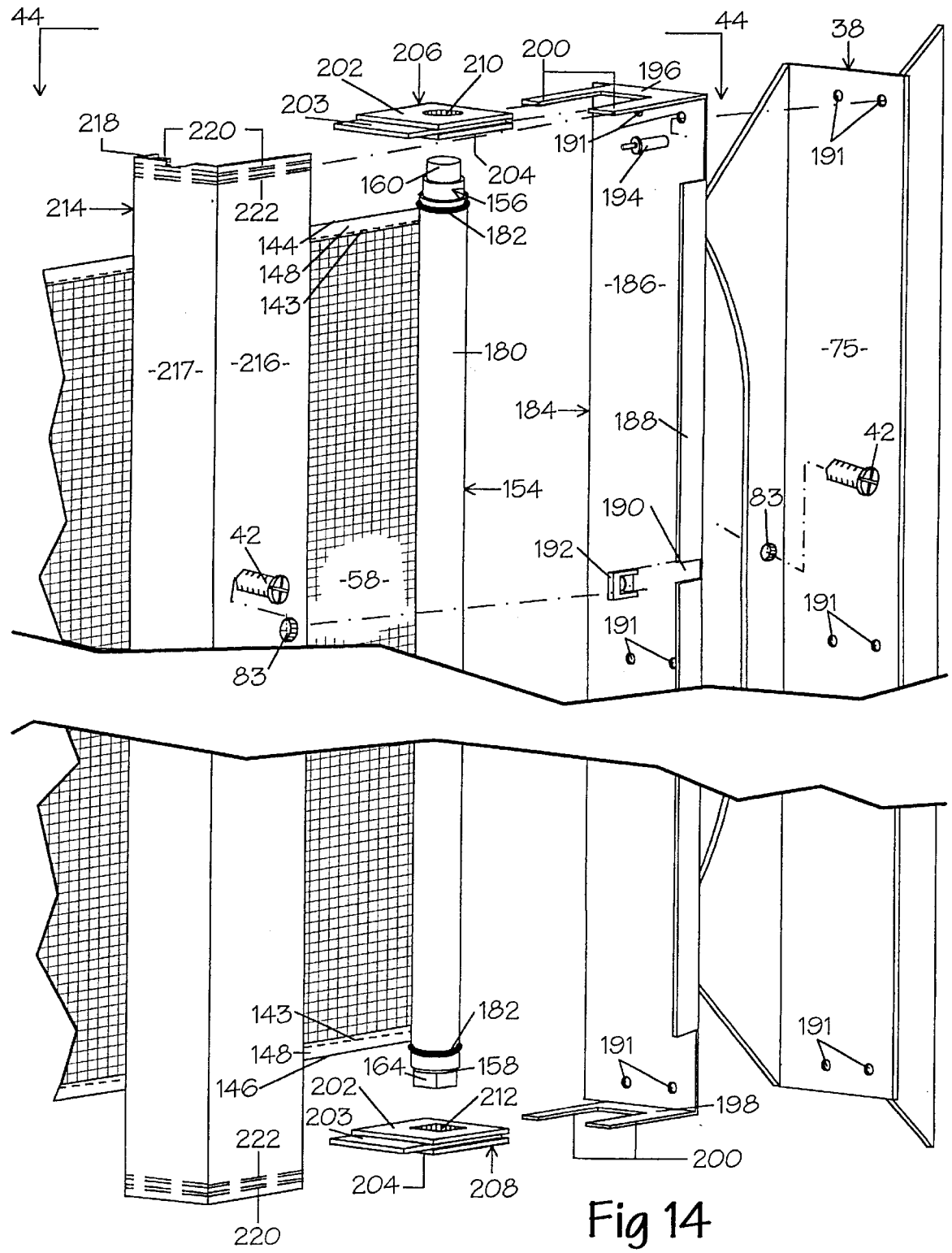
FIG. 14 is an exploded perspective view of the roller housing assembly, depicting the semi-monocoque embodiment, with intermediate portions omitted.

Roller Mount and Housing—FIG. 14

My invention utilizes a roller housing 44 that holds and encloses either of the roller assemblies 154 or 154*a*. Glancing at FIGS. 3 and 4, the roller housing 44 attaches to the inner window frame 36 that is adjacent to the trailing edge 35 of the slideable glass panel 32 when the window is in its closed position.

Base Plate—FIG. 14

It can be seen in FIG. 14 that the roller housing 44 comprises an elongate base plate 184 that can be manufactured from a thinner gauge material than the rest of the window assembly. The base plate 184 has a base side 186 that is of the same general dimensions, although slightly narrower, as the window sill 75 on inner section 38. The base plate 184 has an elongate inwardly extending flange 188 that is perpendicular to the base plate and located along its inner edge.

In the preferred embodiment, the inwardly extending flange 188 contains a plurality of slots or notches 190 that are in register with the through-holes 83 on the inner section 38 to which the base plate 184 is attached. While a through-hole could be used instead of the notch 190, the notch will facilitate access to the screw 42 that is used to attach the inner section 38 to the outer window frame assembly. A spring nut 192 is used to transform the notch 190 into a through-hole that will accept a screw 42 of the same size, yet shorter in length, as the screws used to mount the inner window frame 36 to the outer window frame assembly 24.

The base side 186 further comprises a plurality of through-holes 191. The inner section 38 to which the base plate 184 attaches, is modified such that it contains a like number of through-holes 191 in register with the through-holes in the base plate. A fastener, such as a rivet 194, can be used to attach the base plate 184 to the inner section 38.

At the elongate ends of base plate 184, an inwardly extending flange is considered to form an upper mounting plate holder 196 and a lower mounting plate holder 198. The dimensions of the outer edges of the mounting plate holders are determined by the three sides of a roller cover 214 which attaches to the base plate. In the preferred embodiment, the mounting plate holders 196 and 198 contain cut-outs that result in the formation of inwardly extending arms 200. The dimensions of the arms 200 are determined by the measurements of the mounting plates 206 and 208 (or mounting plate 209) which the arms contain.

The upper and lower mounting plates 206 and 208 can be manufactured from a hard plastic or rubber material. Using such material will thus reduce the likelihood of vibration which may otherwise result from metal-to-metal contact if the invention is used in a vehicle.

Upper and lower mounting plates 206 and 208, and the mounting plate 209 (FIG. 11A), are considered to have three surfaces, a top surface 202, a middle surface 203, and a bottom surface 204. The top and bottom surfaces 202 and 204 can have the same dimensions as each other. Width-wise, they are slightly wider than the distance separating the arms 200 on the corresponding mounting plate holders 196 and 198. Length-wise, they are not as long as the arms 200; they do not extend inwardly as far. In FIG. 14, the depiction of the mounting plates is somewhat exaggerated to more clearly show its shape.

Middle surface 203 is sized width-wise such that it fits in the cut-out formed by the arms 200. It is the same thickness as the gauge of the material used in the manufacture of the base plate 184. Length-wise, the middle surface 203 is as long as the arms 200. Thus, the upper and lower mounting plates 206 and 208, and the mounting plate 209, form a relationship with the mounting plate holders 196 and 198 that receive as to one and extend as to the other. Additionally, when the mounting plates 206 and 208 (or mounting plates 209) are properly assembled in the base plate 184, the ends of the arms 200 are flush with the corresponding edge of the middle surface 203. Thus, the mounting plate holders 196 and 198 have an inwardly facing edge that is generally flat.

The upper and lower mounting plates 206 and 208 each contain holes that are located such that the semi-monocoque roller assembly 154 resides centrally in the base plate 184 upon assembly. (The axle shaft 228 is similarly positioned in mounting plate 209 to hold the monocoque roller assembly 154*a*.) The lower mounting plate 208 contains a square shaped hole 212. The holes 210 and 212 are sized such that they can receive the corresponding closed ends 160 and 164 of the roller assembly 154.

Figure 15:
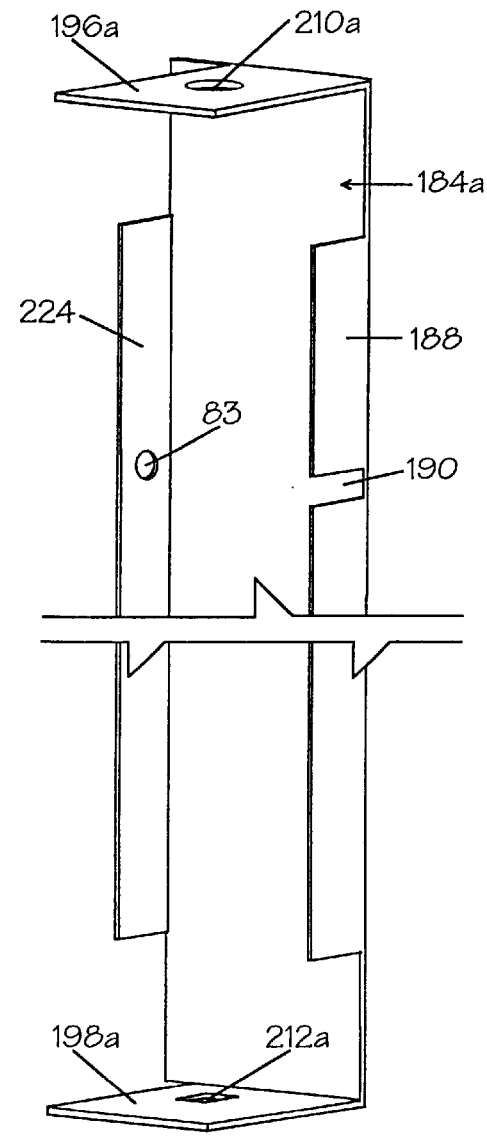
FIG. 15 is a perspective view, with intermediate portions omitted, of a roller assembly mount or base plate showing alternative embodiments.

Another embodiment can be seen in FIG. 15 where a base plate 184*a* is depicted. It can be noted that the mounting plates 206 and 208 (FIG. 14) can be eliminated from the flanges 196 and 198. In this alternative embodiment, a flange 196*a* contains a circular shaped hole 210*a* and a second flange 198*a* contains a square shaped hole 212*a*.

Another embodiment of the base plate 184 would eliminate the through-holes 191 that are located in both the base plate 184 and the inner section 38 of the preferred embodiment (FIG. 14). The rivets 194 that can be used to attach the base plate 184 to the inner section 38 can also be eliminated.

In this alternative embodiment, as shown in FIG. 15, an elongate inwardly extending flange 224 is provided along most of the outer edge of the base plate 184a. The inwardly extending flange 224 contains a plurality of through-holes 83 that are in register with the through-holes 83 located along the inwardly extending flange 74 in the inner section 38 (FIG. 14). Thus, the screws 42 (not shown) that would be used in assembling the base plate 184a to the inner section 38 would additionally serve to mount the inner section 38 to the outer window frame assembly 24.

Roller Cover—FIG. 14

Getting back to FIG. 14, my invention utilizes an elongate roller cover 214 that houses either of the roller assemblies 154 or 154a. It also encloses the components that attach the roller to the inner section 38. As can be seen in FIGS. 3 and 4, the cover is designed such that the entire roller housing 44 has a finished appearance that is consistent with the inner window frame 36.

Referring again to FIG. 14, the roller cover 214 can be manufactured from the same material as the base plate 184. Its dimensions are determined by the length of the base plate 184 and the width of the mounting plate holders 196 and 198. It is considered to have three elongate sides, an inner side 216, an inwardly facing side 217, and an outer side 218.

Inner side 216 extends outwardly from the inwardly facing side 217. It contains a plurality of through-holes 83 that are in register with the notches 190 located in the base plate 184. The outer side 218 extends outwardly as well and is parallel with the inner side 216. The two sides 216 and 218 are connected to each other by the inwardly facing side 217. Width-wise, the outer side 218 does not extend in an outwardly direction to such a degree that it will interfere with the free passage of the flexible screen 58 once everything is finally assembled (FIG. 6).

At the elongate ends of roller cover 214, there are a plurality of flanges located on the inside of each of the three sides 216, 217 and 218. The flanges are identified as an outer stabilizing flange 220 and an inner stabilizing flange 222. The stabilizing flanges 220 and 222 are parallel to each other and separated by a distance equal to the gauge of the material used in base plate 184.

The outer stabilizing flange 220 is located nearest the elongate ends of the roller cover 214. From the elongate ends of the roller cover 214, the outer stabilizing flange 220 is located such that, when the roller housing 214 is assembled with the base plate 184 and the mounting plates 206 and 208 (or 209), the respective top and bottom surfaces 202 and 204 are flush with the elongate ends of the roller housing.

When the roller cover 214 is assembled in final form with the base plate 184 and its associated components, the stabilizing flanges 220 and 222 provide support for the mounting plate holders 196 and 198 as well as the mounting plates 206 and 208 (or 209). Furthermore, because the base plate 184 is not as wide as the window sill 75, the inner side 216 of the roller housing 214 is flush with the inner edge of inner section 38 once everything is assembled (FIG. 6).

Operation

The Inner Window Frame with Retractable Screen can be said to operate as easily as opening and closing the slideable glass panel for which it is designed (FIGS. 3 and 4). However, that simple understanding does not take into account some of the finer details of this invention. The operation of most of the components is described above in the detailed description. Nevertheless, some notable points of operation are described below.

For example, my invention can utilize either a semi-monocoque or a monocoque roller mechanism. A semi-monocoque roller assembly 154 can be seen in FIGS. 10A and 10B. The upper tube section 156 is able to revolve around the lower tube section 158, provided that the lower tube section is prevented from rotating. Inside the upper tube section, the spring anchor 168 fixes the spring 166 to the tube section through its relationship with the anchor rails 162. A second spring anchor 168 provides the same function relative to the lower tube section. Thus, when the upper tube section 156 is rotated in a direction to wind the spring, a biasing force is placed on it. Accordingly, the biasing force will tend to return the upper tube section 156 to the position wherein the spring is unwound.

The upper tube section 156 and the lower tube section 158 together provide a semi-monocoque structure. The upper tube section is long enough so that it reaches between the two surfaces to which the structure is mounted. Thus, while the upper tube section's circular closed end 160 is held in place by a dedicated mounting plate, its opposite end rests against the mounting plate that secures the square closed end 164. In effect, the upper tube section uses the lower tube section for support but uses the mounting plates as axles.

The monocoque embodiment of the roller assembly can be seen in FIGS. 11A and 11B. By combining the roller tube, the spring, and the two mounting plates, a roller mechanism can be seen to exist that is substantially different than that used in prior art. The roller tube 226 is able to revolve around the axle shafts 228 that are an integral part of the mounting plates 209. Inside the roller tube, one end of the spring 166a is attached to the tube while the other end is attached to the mounting plate 209. Thus, when the roller tube 226 is rotated in a direction to wind the spring, a biasing force is placed on it. Accordingly, the biasing force will tend to return the roller tube 226 to the position wherein the spring is unwound.

By referring to FIG. 14, it can be seen that the semi-monocoque embodiment utilizes a pair of mounting plates 206 and 208 to hold the roller assembly 154 onto the base plate 184. In the monocoque embodiment, a pair of mounting plates 209 provide the same function relative to roller assembly 154a. Both roller assemblies 154 and 154a are compact. Assembled to include the screen holders 180 (FIG. 12), the complete assembly, as shown in the described embodiment, has a diameter of only 8.8 mm ($^{11}/_{32}$ in). With regard to the semi-monocoque roller assembly 154, it's closed ends 160 and 164 are even smaller.

The mounting plates 206 and 208 (or a single mounting plate 209) can effectively be used as hand-tools when the roller assembly is mounted to the base plate 184. The lower mounting plate 208 (or a single mounting plate 209) can be used to wind the mechanism before it is attached to the base plate. The lower mounting plate 208 is larger than the square closed end 164. Thus, it is easier to wind the spring using the lower mounting plate 208 than by merely grabbing the small sized square closed end 164. Considering the confined space into which my invention will fit, it may also be easier to manipulate the roller assembly, before it is attached to the window frame, by utilizing a mounting plate as a hand tool.

Looking now at FIGS. 5 and 6, it can be seen that the embodiment of my invention described herein utilizes a plurality of sealing rubbers 94 and 94a. The sealing rubber 94 not only forms a barrier to bugs, it holds the flexible screen 58 in place as it moves back and forth in the narrow screen channel 87.

In the embodiment described herein, the invention uses an additional sealing rubber 94a that runs the length of the roller housing 44. The additional sealing rubber 94a has a top side 96a that acts to prevent bugs from entering the roller housing. It can also be seen to function as a sort of screen cleaner.

In any kind of window covering, both security and safety are considerations. My invention takes both of those factors into account. As can be seen in FIG. 8, the invention utilizes a plurality of components to attach the flexible screen 58 to the slideable glass panel 32. The components include the means to detach the flexible screen as well.

Among the components depicted in FIG. 8 is the rigid screen attachment 56. The rigid screen attachment contains a screen latch 62 that, in effect, locks the rigid screen attachment to the slideable glass panel 32. Accordingly, the screen latch 62 thus provides a modicum of security when the window is open.

The rigid screen attachment 56 also has a screen handle 60. To remove the flexible screen 58 from its attachment to the slideable glass panel 32, one simply opens the screen latch 62 then pulls on the handle 60 to disengage the channel 140 from the extending side 118 on the rigid frame attachment 54.

Conclusions, Ramifications, and Scope of Invention

Thus the reader will see that the Inner Window Frame with Retractable Screen provides an attractive modification to the typical window used in many RVs. As described above, the components are modular and thus allow for ease of installation and the replacement of parts. Furthermore, my invention has additional advantages in that:

(a) it provides a retractable screen mechanism that leaves the glass panels unobstructed when the window is closed;

(b) it provides an effective means to prevent bugs from entering an RV when the window is open;

(c) it provides a screen that does away with any type of overlap that inhibits the ability to easily clean the entire sliding glass panel;

(d) it provides a retractable screen enclosure that is located inside the RV;

(e) it provides a compact monocoque, or semi-monocoque, roller mechanism and its housing that fits within the confines of an existing RV window assembly by using fewer parts than the conventional design;

(f) it provides a choice of roller assemblies both of which are light-weight and take into account noise and reliability issues that are caused by vibration;

(g) it provides a means to attach one end of the screen to the slideable glass panel in such a way that preserves the aesthetics of the rounded corners used in the typical window, while meeting the space limitations inherent through the use of those corners;

(h) it provides a way to easily detach the screen from the slideable glass panel in case the window opening is needed for such things as an emergency exit.

While my above description contains many specificities, these should not be construed as limitations on the scope of the invention, but rather than as an exemplification of one or more preferred embodiments thereof. Many other variations are possible. For example while I have alluded to a specific type of material for a number of components, other similar materials could be used instead.

Furthermore, the use of a semi-monocoque roller assembly 154, or a monocoque roller assembly 154a, is not mandatory in this invention. However, either of them may be cheaper to manufacture than a typical roller assembly that uses a central steel shaft as the means to apply a spring's biasing energy to a roller tube. Additionally, in wider windows that use a lot of screen material, it may not be possible to construct a roller mechanism using the central shaft design such that it can fit within the confines of the inner window frame while holding the screen material when it is rolled up.

The semi-monocoque roller assembly 154 herein described shows a plurality of anchor rails and corresponding slots to attach the spring to the roller tubes. The number of rails and slots is not important to the scope of this invention. Furthermore, the spring anchors themselves may be eliminated by directly fastening the ends of the spring to the roller tubes.

The embodiment described herein assumes the invention will be used without additional window treatments, such as valances. Therefore, the embodiment describes a base plate that attaches to the inner window frame. However, the base plate and its corresponding components can be attached to the inner side of a valance without affecting the scope of my invention.

The embodiment herein described assumes that the viewing area through the glass will be conserved. The use of an existing inner window frame can be utilized with my invention but the viewing area through the glass will be reduced. Existing inner window frames generally have rounded corners. Thus, the roller housing will have to be positioned more inwardly along the window sills to allow the screen material to reach the screen channels. In so doing, the viewing area will be reduced.

The embodiment herein described contains specifications for a means to attach the flexible screen to the roller tube. The screen can be attached by other means such as adhesive tape or glue. Using that means, however, may require that the screen material is wrapped around the roller tube a number of times to ensure it does not become inadvertently detached. The multiple wrappings may take up more room than do the screen holders herein described. In wider windows that use a lot of screen material, the additional room may not be available.

The preferred embodiment utilizes a base plate to hold the roller assembly, that is attached to the window sill on the inner section. Another embodiment, also described, would attach the base plate to the inner section's inwardly extending flange rather than its window sill. While either means of attachment is acceptable, the preferred embodiment provides a more secure, vibration free attachment.

A number of dimensions have been specified herein. However, these dimensions are applicable to only one embodiment. Other sizes can be used and in fact may be determined by the type of material used.

The specifications of the embodiment for the flexible screen include the use of flexible material to prevent chafe. The material is also used to provide the means to attach the flexible screen to the rigid screen attachment. It can be noted that the flexible material can be eliminated without affecting the scope of this invention. Similarly, the rod that is used in the attachment can be eliminated if the flexible material is used along the leading edge and it is thick enough to be firmly held by the rigid screen attachment.

The ultimate shape of a number of components in this invention depends on the typical window with which it is actually used. A number of different manufacturers produce the same style of typical window. However, each manufacturer may employ slight variations. Those variations may, in turn, affect many of the components associated with my invention.

For instance, the description herein assumes the typical window has rounded or radius corners. The description makes that assumption in order to illustrate the additional room provided by the embodiment's inner window frame. If a typical window has square corners it does not affect the scope of this invention. Rather, the shape and design of the inner window frame is defined more by the preferment for additional room at the corners than by the specifications herein described.

In addition, this invention describes a rigid screen attachment in detail. The rigid screen attachment not only holds one end of the flexible screen, it is designed such that it fits in close enough proximity to the slideable glass panel, its frame, or associated parts, such that it provides an effective barrier against the intrusion of insects. Its ultimate shape is defined more by the need for a bug barrier than by the specifications as herein described.

Additionally, the specifications used to illustrate the embodiment describe a rigid frame member designed such that it can be firmly attached to a frame that encases a slideable glass panel. However, the features of the rigid frame attachment that allow it to hold the rigid screen attachment can be incorporated into the manufacture of the frame itself such that a separate rigid frame attachment would be unnecessary. Like the rigid screen attachment, the ultimate design of the rigid frame attachment is dictated more by its features, combined with an existing window's design, than by the specifications herein described.

Thus the scope of the invention should be determined by the appended claims and their legal equivalents, rather than by the examples given.

I claim:

1. A compact roller assembly having no central through-shaft comprising:
   a. a roller tube, said roller tube being constructed of a thin walled material, said roller tube comprising an inside surface and thus an inner circumferential dimension and both an inner diametrical dimension and an outer diametrical dimension, said roller tube further including an elongate dimension, whereby said roller tube is lightweight and contributes to a compact structure;
   b. a spiral or coil spring inside said roller tube, said coil spring having a substantially hollow core, said coil spring having two ends, said coil spring further having both an outer circumferential dimension and an elongate dimension;
   c. said roller tube including a first attachment means for securing the first of said two ends of said coil spring to said roller tube;
   d. a plurality of mounting plates each having an inner surface, said inner surface including a short axle shaft being disposed thereon, said axle shaft being generally cylindrical in shape and thus having a diametrical dimension, said diametrical dimension being minimally less than said inner diametrical dimension of said roller tube, said axle shafts being disposed inside both ends of said roller tube, said axle shafts further being separate and disconnected and independent of each other, whereby the central core of said roller tube remains hollow between said axle shafts and whereby said roller tube can rotate around said axle shafts;
   e. said plurality of mounting plates each further including an outer surface, said outer surface including a fastening means disposed thereon for securing said plurality of mounting plates to a secure surface, whereby said plurality of mounting plates can support said roller tube in a vertical, horizontal or angular orientation;
   f. said axle shafts each including a second attachment means for securing the second of said two ends of said coil spring, whereby rotation of said roller tube in one direction around said axle shafts winds said coil spring.

2. The roller assembly of claim 1, wherein said outer circumferential dimension of said coil spring is predetermined by said inner circumferential dimension of said roller tube, said outer circumferential dimension of said coil spring being minimally less than said inner circumferential dimension of said roller tube, whereby said inside surface of said roller tube provides support means for keeping said coil spring in a substantially rectilinear orientation and whereby said roller tube can rotate around said coil spring without making of frictional contact with said coil spring.

3. The roller assembly of claim 1, wherein said outer surface of said mounting plates comprises either a diametrical dimension or a width-wise dimension, said diametrical dimension or said width-wise dimension of said outer surface being predetermined by said outer diametrical dimension of said roller tube, said diametrical dimension or said width-wise dimension of said outer surface being at least equal to said outer diametrical dimension of said roller tube, said roller tube being mounted between said outer surfaces of said mounting plates, whereby said outer surfaces of said mounting plates in combination provide a platform between which said roller tube is prevented from moving laterally.

4. The roller assembly of claim 1, wherein said axle shafts are comprised of an elongate dimension being predetermined by said elongate dimension of said roller tube, said elongate dimension of said axle shafts being a materially minimum fraction of said elongate dimension of said roller tube, whereby said roller tube can rotate around said axle shafts with a minimal amount of frictional contact and whereby the central core of said roller tube remains hollow between said axle shafts.

5. The roller assembly of claim 1, wherein said second attachment means comprises a spring anchor, said spring anchor being disposed inside said second of said two ends of said coil spring, said spring anchor further being minimally less in width or diameter than said diametrical dimension of said axle shaft, whereby said coil spring can surround said spring anchor and said outer circumferential dimension of said coil spring will remain substantially unchanged and whereby said roller tube can rotate around said coil spring without making frictional contact with said coil spring.

6. The roller assembly of claim 5, wherein said spring anchor comprises an elongate dimension, said spring anchor further including a hole being disposed on its elongate surface, said second of said two ends of said coil spring being disposed inside said hole, said elongate dimension of said spring anchor being predetermined by said elongate dimension of said coil spring, said elongate dimension of said spring anchor being a materially minimum fraction of said elongate dimension of said coil spring, whereby said inside of said coil spring remains substantially hollow and whereby said coil spring can wind up without being substantially restricted.

7. A compact roller assembly having no central through-shaft comprising:
   a. a lower or inner tube section, said inner tube section comprising two ends, one of said two ends of said inner tube section being open, the other of said two ends of said inner tube section comprising a non-circular crown, said inner tube section further including an inner surface and thus an inner circumferential dimension, said inner tube section further including an elongate dimension and both an outer diametrical dimension and an outer circumferential dimension, said inner tube section being constructed of a thin walled material, whereby said inner tube section is lightweight and contributes to a compact structure;

b. a spiral or coil spring having two ends, the first of said two ends of said coil spring being disposed inside said inner tube section, said coil spring having a substantially hollow core, said coil spring additionally having an elongate dimension and further comprising both an outer circumferential dimension and an inner circumferential dimension;

c. said inner tube section including a first attachment means for securing said first of said two ends of said coil spring to said inner tube section;

d. an upper or outer tube section, said outer tube section comprising two ends, one of said two ends of said outer tube section being open, the other of said two ends of said outer tube section comprising a circular crown, said outer tube section further including an elongate dimension and both an outer diametrical dimension and an inner circumferential dimension, said outer tube section being constructed of a thin walled material, whereby said outer tube section is lightweight and contributes to a compact structure;

e. the second of said two ends of said coil spring being disposed inside said outer tube section;

f. said outer tube section including a second attachment means for securing said second of said two ends of said coil spring to said outer tube section, said attachment means comprising at least one short flute or anchor rail being disposed longitudinally on said outer tube section;

g. said inner tube section being disposed inside said outer tube section, said inner tube section and said outer tube section including no attachment means for fastening said two sections together, whereby rotation of said outer tube section in one direction around said inner tube section winds said coil spring.

8. The roller assembly of claim 7, wherein said non-circular crown is indented of said inner tube section, said non-circular crown being comprised of at least one widthwise dimension being less than said outer diametrical dimension of said inner tube section, whereby when said non-circular crown of said inner tube section is disposed inside a similar shaped and sized non-circular hole or opening, said inner tube section is prevented from rotating and from passing through said similar shaped and sized non-circular hole or opening.

9. The roller assembly of claim 7, wherein said circular crown is indented of said outer tube section, said circular crown being comprised of a diametrical dimension being less than said outer diametrical dimension of said outer tube section, whereby when said circular crown of said outer tube section is disposed inside a similar shaped and sized circular hole or opening, said outer tube section is allowed to rotate but is prevented from passing through said similar shaped and sized circular hole or opening.

10. The roller assembly of claim 7, wherein:
a. said outer circumferential dimension of said coil spring is predetermined by said inner circumferential dimension of said inner tube section, said outer circumferential dimension of said coil spring being minimally less than said inner circumferential dimension of said inner tube section;
b. said outer circumferential dimension of said inner tube section is predetermined by said inner circumferential dimension of said outer tube section, said outer circumferential dimension of said inner tube section being minimally less than said inner circumferential dimension of said outer tube section, whereby said inner tube section acts as an axle around which said outer tube section can rotate and whereby the combined inside surfaces of both said inner tube section and said outer tube section provide support means for keeping said coil spring in a substantially rectilinear orientation.

11. The roller assembly of claim 7, wherein said elongate dimension of said inner tube section is predetermined by said elongate dimension of said outer tube section, said elongate dimension of said inner tube section being a minimum fraction of said elongate dimension of said outer tube section, whereby said outer tube section can rotate around said inner tube section with a minimal amount of frictional contact.

12. The roller assembly of claim 7, wherein said second attachment means for securing said second of said two ends of said coil spring comprises:
a. a spring anchor, said spring anchor having two ends;
b. the first end of said two ends of said spring anchor comprising a disk, said disk having a circumferential dimension predetermined by said inner circumferential dimension of said outer tube section, said circumferential dimension of said disk being less than said inner circumferential dimension of said outer tube section;
c. said disk including at least one notch being disposed thereon, said notch forming an interconnecting relationship with said anchor rail in said outer tube section, whereby when said spring anchor is disposed inside said outer tube section, said notch engages said anchor rail and said spring anchor is allowed to travel longitudinally along said outer tube section but not allowed to rotate.

13. The roller assembly of claim 12, wherein the second end of said two ends of said spring anchor comprises a spring shaft or spring post, said spring post having either a diametrical dimension or a width-wise dimension, said diametrical dimension or said width-wise dimension being predetermined by said inner circumferential dimension of said coil spring, said diametrical dimension or said width-wise dimension of said spring post being minimally less than said inner circumferential dimension of said coil spring, said spring post further having an elongate dimension predetermined by said elongate dimension of said coil spring, said elongate dimension of said spring post being a materially minimum fraction of said elongate dimension of said coil spring, said spring post being disposed inside said second of two said ends of said coil spring, whereby said coil spring surrounds said spring post and whereby said inside of said coil spring remains substantially hollow.

* * * * *